United States Patent
Ogawa

(10) Patent No.: US 9,540,786 B2
(45) Date of Patent: Jan. 10, 2017

(54) CONSTRUCTION MACHINE CONTROL SYSTEM

(71) Applicant: Kabushiki Kaisha TOPCON, Itabashi-ku, Tokyo-to (JP)

(72) Inventor: Takashi Ogawa, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/204,345

(22) Filed: Mar. 11, 2014

(65) Prior Publication Data
US 2014/0271074 A1    Sep. 18, 2014

(30) Foreign Application Priority Data
Mar. 14, 2013    (JP) .................................. 2013-051315

(51) Int. Cl.
*E02F 9/26* (2006.01)
*E02F 3/30* (2006.01)
(Continued)

(52) U.S. Cl.
CPC .............. *E02F 3/436* (2013.01); *E02F 9/261* (2013.01); *E02F 9/264* (2013.01); *G01C 9/02* (2013.01)

(58) Field of Classification Search
USPC ........................................................ 701/50
See application file for complete search history.

(56) References Cited

U.S. PATENT DOCUMENTS

| | | | | |
|---|---|---|---|---|
| 5,701,400 A | * | 12/1997 | Amado | G06N 5/02 706/45 |
| 6,233,545 B1 | * | 5/2001 | Datig | G06N 3/004 704/2 |

(Continued)

FOREIGN PATENT DOCUMENTS

| | | | | |
|---|---|---|---|---|
| JP | 2002-181538 A | | 6/2002 | |
| JP | 2002181538 A | * | 6/2002 | ............. G01C 15/00 |

(Continued)

OTHER PUBLICATIONS

European communication mailed Nov. 21, 2014 in corresponding European patent application No. 14159285.7.

*Primary Examiner* — Jean-Paul Cass
(74) *Attorney, Agent, or Firm* — Nields, Lemack & Frame, LLC

(57) ABSTRACT

The invention provides a construction machine control system comprising a working tool (7), a working arm (5) for supporting the working tool and for operating the working tool as required, a machine body (2) for supporting the working arm and for being rotatable, a rotating direction acquiring unit (13, 14) provided on the machine body, a control unit having a storage unit and a display unit, wherein the working arm is configured by two or more links with length already known respectively which are connected in a bendable manner, wherein there are further provided a two-axis tilt sensor on the machine body for detecting a horizontal position, a working arm tilt sensor for detecting a tilting of each links of the working arm, and a working tool tilt sensor for detecting a tilting of the working tool, wherein the control unit displays a guidance screen on the display unit based on a working data stored in the storage unit and where a working position and a design gradient are set, based on a direction of the machine body acquired from the rotating direction acquiring unit, and based on detection (Continued)

results of the two-axis tilt sensor, the working arm tilt sensor and the working tool tilt sensor, and the guidance screen displays a guiding information for guiding the working tool to the working position.

19 Claims, 18 Drawing Sheets

(51) Int. Cl.
 *E02F 3/43* (2006.01)
 *G01C 9/02* (2006.01)

(56) References Cited

U.S. PATENT DOCUMENTS

| | | | |
|---|---|---|---|
| 8,296,221 B1* | 10/2012 | Waelbroeck | G06Q 40/00 |
| | | | 705/37 |
| 2003/0147727 A1 | 8/2003 | Fujishima et al. | |
| 2005/0090933 A1* | 4/2005 | Ebert | B25J 9/1694 |
| | | | 700/245 |
| 2009/0138307 A1* | 5/2009 | Belcsak | G06Q 40/06 |
| | | | 705/36 R |
| 2009/0177337 A1* | 7/2009 | Yuet | G05D 1/0044 |
| | | | 701/2 |
| 2010/0245587 A1* | 9/2010 | Otani | G01C 15/002 |
| | | | 348/169 |
| 2011/0178677 A1 | 7/2011 | Finley et al. | |
| 2011/0258049 A1* | 10/2011 | Ramer | G06F 17/30867 |
| | | | 705/14.66 |
| 2013/0158797 A1 | 6/2013 | Fukano et al. | |
| 2013/0175092 A1 | 7/2013 | Kolpack et al. | |
| 2014/0201126 A1* | 7/2014 | Zadeh | G06K 9/627 |
| | | | 706/52 |
| 2016/0026253 A1* | 1/2016 | Bradski | G02B 27/225 |
| | | | 345/8 |

FOREIGN PATENT DOCUMENTS

| | | |
|---|---|---|
| JP | 2012-255286 A | 12/2012 |
| WO | 2012/114872 A1 | 8/2012 |

* cited by examiner

| BUCKET GRADIENT OK | ROTATE IN RIGHTWARD DIRECTION | ROTATION OK | ROTATE IN LEFTWARD DIRECTION |
|---|---|---|---|
| | 34Aa / 35 / 36 | 34Ab / 35 / 36 | 34Ac / 35 / 36 |
| MOVE BUCKET DOWNWARD | 34Ad / 35 / 36 | 34Ae / 36 / 35 | 34Af / 36 / 35 |
| BUCKET HEIGHT OK | 34Ag / 35 / 36 | 34Ah / 36 / 35 | 34Ai / 36 / 35 |
| MOVE BUCKET UPWARD | | | |

CONSTRUCTION MACHINE CONTROL SYSTEM

BACKGROUND OF THE INVENTION

The present invention relates to a construction machine control system, which has a guidance screen to guide buckets with respect to an excavating surface in a case where civil engineering operation is carried by using a construction machine, e.g. a construction machine having a bucket.

When civil engineering operation is carried out by using a construction machine, for instance, in a case where excavation of civil engineering operation such as excavation or formation of slope face is carried out by an excavator, as disclosed in the Japanese Patent Publication JP-A-2012-255286, an operator identifies working data from a guidance screen displayed on a display unit, completes an approximate working operation based on the guidance of the guidance screen, then excavates and forms the face of slope while measuring, and coincides these data with the working data.

FIG. 18 shows a guidance screen 51 disclosed in the Japanese Patent Publication JP-A-2012-255286 as displayed on the display unit (not shown). The guidance screen 51 displays a position and a posture of a bucket 54 in three-dimensional display with respect to a working data 52.

Of the guidance screen 51, the position and the posture of the bucket 54, which are guiding information for guiding the bucket 54 to target height, are displayed on a window 55, an azimuth, which is the guiding information for making the bucket 54 face directly toward the excavating surface, is displayed on a window 56, and on windows 57 and 58, a moving direction, which is the guiding information for guiding the bucket 54 to target gradient is displayed. Further, the working data 52 are stereoscopically displayed on a window 59.

An operator carries out an excavation operation by controlling the position, the posture, the azimuth, and the moving direction, etc. of the bucket 54 according to the guide, while identifying the present situation based on various types of guiding information displayed on the windows 56 to 59.

However, in the guidance screen 51 as taught in the Japanese Patent Publication JP-A-2002-181538, since the various types of guiding information are individually displayed on the windows 56 to 59, the operator had to connect the various types of information by himself and to identify the guiding information.

It is to be noted that, in the Japanese Patent Publication JP-A-2012-255286 discloses a structure that two GPS antennas are used on the construction machine for civil engineering operation, a three-dimensional position coordinates of a rotation center position of an arm is obtained, and a three-dimensional coordinates of a blade edge of a bucket is obtained based on the three-dimensional position coordinates and an directional angle of the arm.

SUMMARY OF THE INVENTION

It is an object of the present invention to provide a construction machine control system, which it is possible to easily identify various types of guiding information for guiding a working tool to a working position in the civil engineering operation.

To attain the above object, the construction machine control system according to the present invention, comprises a working tool, a working arm for supporting the working tool and for operating the working tool as required, a machine body for supporting the working arm and for being rotatable, a rotating direction acquiring unit provided on the machine body, a control unit having a storage unit and a display unit, wherein the working arm is configured by two or more links with length already known respectively which are connected in a bendable manner, wherein there are further provided a two-axis tilt sensor on the machine body for detecting a horizontal position, a working arm tilt sensor for detecting a tilting of each links of the working arm, and a working tool tilt sensor for detecting a tilting of the working tool, wherein the control unit displays a guidance screen on the display unit based on a working data stored in the storage unit and where a working position and a design gradient are set, based on a direction of the machine body acquired from the rotating direction acquiring unit, and based on detection results of the two-axis tilt sensor, the working arm tilt sensor and the working tool tilt sensor, and the guidance screen displays a guiding information for guiding the working tool to the working position.

Further, in the construction machine control system according to the present invention, the rotating direction acquiring unit further comprises a position acquiring means for acquiring absolute coordinates of the machine body, and an operating position of the machine body is acquired by the position acquiring means.

Further, in the construction machine control system according to the present invention, the position acquiring means is provided on the machine body, absolute coordinates are acquired by the position acquiring means while the machine body rotates, absolute coordinates of a rotation center is acquired based on the absolute coordinates acquired at the time of rotation, and direction of the machine body is acquired from absolute coordinates of the rotation center and from absolute coordinates of the position acquiring means.

Further, in the construction machine control system according to the present invention, the position acquiring means comprises a prism disposed at a position as required of the machine body, and a total station installed at a known position.

Further, in the construction machine control system according to the present invention, a working position mark and a bucket mark having predetermined shapes are displayed on the guidance screen as guiding information, a condition of the working tool with respect to the working position is indicated depending on a change of the shape of the bucket mark and on a difference of position with respect to the working position mark, and the working tool is guided to the working position so that the shape and the position of the working position mark and the bucket mark coincide with each other.

Further, in the construction machine control system according to the present invention, the bucket mark indicates the difference between a design gradient and a gradient of the working tool by the change of shape with respect to the working position mark, and shows the difference between the position of the working tool and the working position by the change of position of the bucket mark with respect to the working position mark.

Further, in the construction machine control system according to the present invention, the working position mark and the bucket mark are in polygonal shape, two vertexes of polygon of the bucket mark are controlled in a displaceable manner, and the gradient of the working tool with respect to the design gradient is displayed by a distance between the two vertexes.

Further, in the construction machine control system according to the present invention, the working position mark and the bucket mark are in circular or elliptical shape, the length of one diameter of the bucket mark is constant, the length of a diameter perpendicularly crossing the diameter is controlled variably, and the gradient of the working tool with respect to the design gradient is displayed, depending on the length of the diameter perpendicularly crossing each other.

Further, in the construction machine control system according to the present invention, the guidance screen further displays numeral value information.

Further, in the construction machine control system according to the present invention, the guidance screen further displays an arrowmark to indicate a direction of the working position and a rotating direction up to the design gradient.

Further, in the construction machine control system according to the present invention, the guidance screen further displays a direction of the working tool, a height of the working tool, and the gradient of the working tool.

Further, in the construction machine control system according to the present invention, the guidance screen further displays a GPS condition.

Furthermore, in the construction machine control system according to the present invention, the guidance screen further displays the working data.

According to the present invention, the construction machine control system comprises a working tool, a working arm for supporting the working tool and for operating the working tool as required, a machine body for supporting the working arm and for being rotatable, a rotating direction acquiring unit provided on the machine body, a control unit having a storage unit and a display unit, wherein the working arm is configured by two or more links with length already known respectively which are connected in a bendable manner, wherein there are further provided a two-axis tilt sensor on the machine body for detecting a horizontal position, a working arm tilt sensor for detecting a tilting of each links of the working arm, and a working tool tilt sensor for detecting a tilting of the working tool, wherein the control unit displays a guidance screen on the display unit based on a working data stored in the storage unit and where a working position and a design gradient are set, based on a direction of the machine body acquired from the rotating direction acquiring unit, and based on detection results of the two-axis tilt sensor, the working arm tilt sensor and the working tool tilt sensor, and the guidance screen displays a guiding information for guiding the working tool to the working position. As a result, it is possible to easily identify the guiding information for guiding the working tool to a target position, and improves the working efficiency.

Further, according to the present invention, the rotating direction acquiring unit further comprises a position acquiring means for acquiring absolute coordinates of the machine body, and an operating position of the machine body is acquired by the position acquiring means. As a result, it is possible to acquire absolute coordinates of the machine body even when the machine body moves.

Further, according to the present invention, the position acquiring means is provided on the machine body, absolute coordinates are acquired by the position acquiring means while the machine body rotates, absolute coordinates of a rotation center is acquired based on the absolute coordinates acquired at the time of rotation, and direction of the machine body is acquired from absolute coordinates of the rotation center and from absolute coordinates of the position acquiring means. As a result, there is no need to detect the direction of the machine body only by the position acquiring means, and the configuration can be simplified.

Further, according to the present invention, the position acquiring means comprises a prism disposed at a position as required of the machine body, and a total station installed at a known position. As a result, it is possible to acquire absolute coordinates of the machine body because the total station performs tracking on the prism.

Further, according to the present invention, a working position mark and a bucket mark having predetermined shapes are displayed on the guidance screen as guiding information, a condition of the working tool with respect to the working position is indicated depending on a change of the shape of the bucket mark and on a difference of position with respect to the working position mark, and the working tool is guided to the working position so that the shape and the position of the working position mark and the bucket mark coincide with each other. As a result, by displaying guiding information which were displayed individually on one screen, there is no need for the operator to perform excavating work by connecting various types of guiding information, and this contributes to the improvement of the working efficiency by easily identifying the guiding information.

Further, according to the present invention, the bucket mark indicates the difference between a design gradient and a gradient of the working tool by the change of shape with respect to the working position mark, and shows the difference between the position of the working tool and the working position by the change of position of the bucket mark with respect to the working position mark. This makes it possible to easily identify the guiding information.

Further, according to the present invention, the working position mark and the bucket mark are in polygonal shape, two vertexes of polygon of the bucket mark are controlled in a displaceable manner, and the gradient of the working tool with respect to the design gradient is displayed by a distance between the two vertexes. This makes it possible to identify the guiding information in easier manner.

Further, according to the present invention, the working position mark and the bucket mark are in circular or elliptical shape, the length of one diameter of the bucket mark is constant, the length of a diameter perpendicularly crossing the diameter is controlled variably, and the gradient of the working tool with respect to the design gradient is displayed, depending on the length of the diameter perpendicularly crossing each other. This makes it possible to identify the guiding information in easier manner.

Further, according to the present invention, the guidance screen further displays numeral value information. This makes it possible to identify the guiding information up to the working position more easily.

Further, according to the present invention, the guidance screen further displays an arrowmark to indicate a direction of the working position and a rotating direction up to the design gradient. This makes it possible to identify the guiding information up to the working position more easily.

Further, according to the present invention, the guidance screen further displays a direction of the working tool, a height of the working tool, and the gradient of the working tool. This makes it possible to identify the guiding information up to the working position and the present state of the working tool at the same time.

Further, according to the present invention, the guidance screen further displays a GPS condition. This makes it possible to identify the accuracy of the guiding information together with the guiding information.

Furthermore, according to the present invention, the guidance screen further displays the working data. As a result, it is possible to identify the guiding information up to the working position and the present condition at the same time.

BRIEF DESCRIPTION OF THE DRAWINGS

FIG. 5 shows display examples of guidance screens according to a first embodiment of the present invention, showing a case where a gradient of a working tool is equal to a design gradient.

FIG. 7 shows display examples of guidance screens according to the first embodiment of the present invention, showing a case where the gradient of the working tool is higher than the design gradient.

FIG. 8 shows display examples of guidance screens according to a second embodiment of the present invention, showing a case where the gradient of the working tool is equal to the design gradient.

FIG. 10 shows display examples of guidance screens according to the second embodiment of the invention, showing a case where the gradient of the working tool is higher than the design gradient.

FIG. 11 shows display examples of guidance screens according to a third embodiment of the present invention, showing a case where gradient of the working tool is equal to the design gradient.

FIG. 13 shows display examples of guidance screen according to the third embodiment of the present invention, showing a case where the gradient of the working tool is higher than the design gradient.

FIG. 14 shows display examples of guidance screens according to a fourth embodiment of the present invention, showing a case where the gradient of the working tool is equal to the design gradient.

FIG. 16 shows display examples of guidance screens according to the fourth embodiment of the present invention, showing a case where the gradient of the working tool is higher than the design gradient.

Each of FIG. 17A to FIG. 17E show other display examples of the guidance screens.

Figure 18:
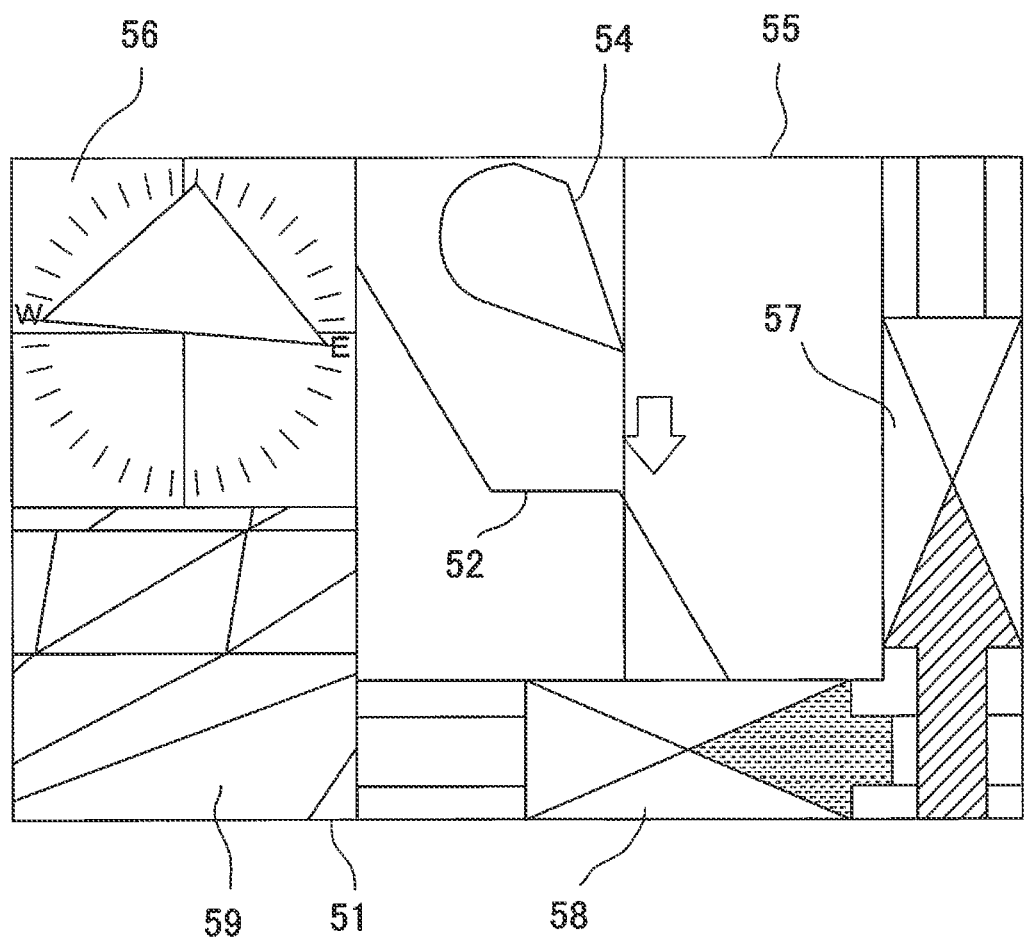

FIG. 18 is an explanatory drawing to show a guidance screen disclosed in the Japanese Patent Publication JP-A-2012-255286.

DETAILED DESCRIPTION OF THE PREFERRED EMBODIMENTS

Description will be given below on an embodiment of the present invention by referring to the attached drawings.

Figure 1:
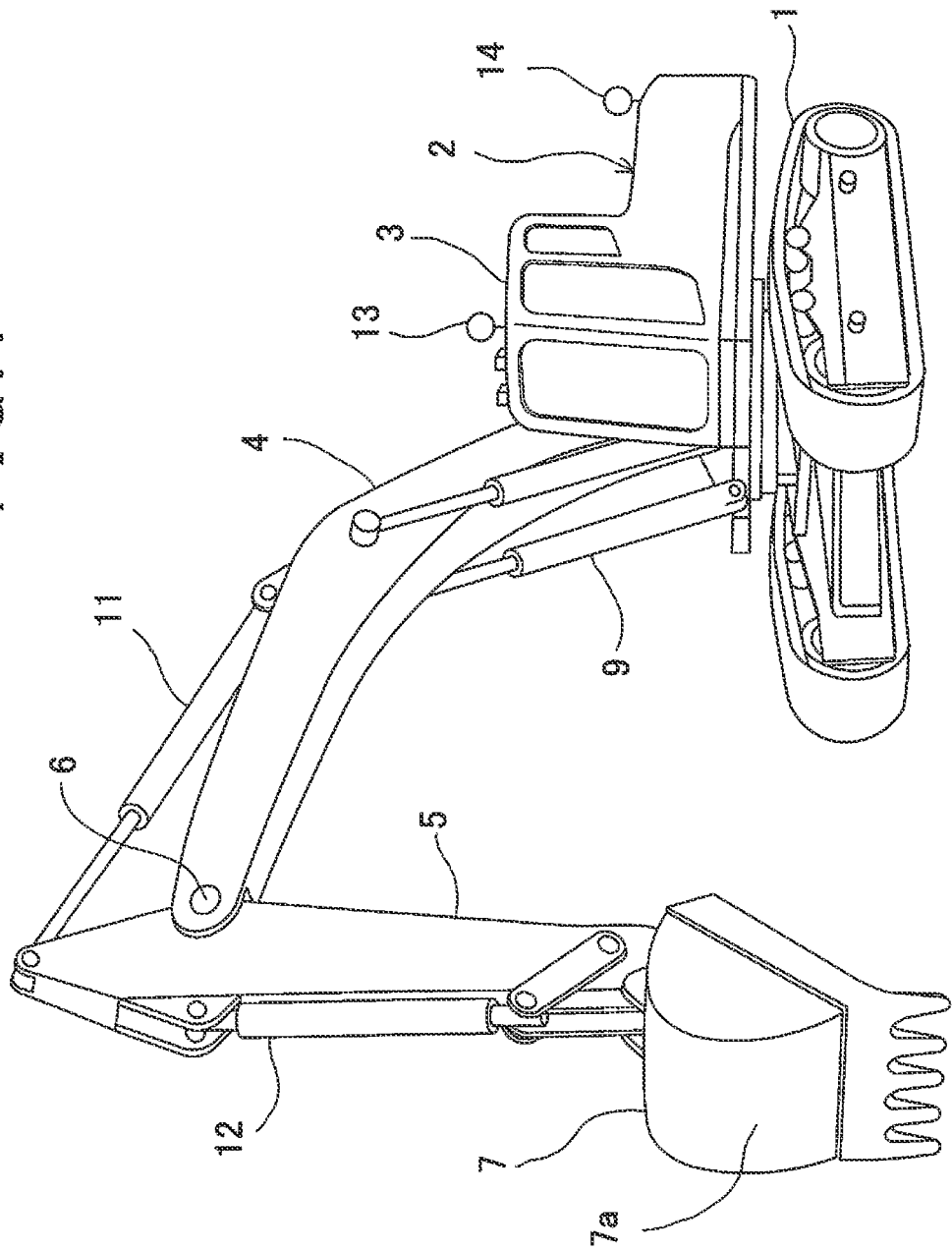
FIG. 1 is a perspective view to show an embodiment, in which the present invention is applied to an excavator.

FIG. 1 shows a case where the present invention is applied on an excavator which is a construction machine.

A machine body 2 is provided on a running driving body 1, and the machine body 2 is designed to be rotatable around a vertical center line with respect to the running driving body 1. The machine body 2 has an operation room 3, the operation room 3 is offset from the rotation center of the machine body 2, and a boom 4 is provided in the rotation center of the machine body 2 so that the boom 4 can be moved up and down. The center of the moving up and down operation (rotation center) of the boom 4 is placed on the vertical center line, and the boom 4 can be rotated around a horizontal center line, which perpendicularly crosses the vertical center line. At a forward end of the boom 4, an arm 5 is rotatably provided around a shaft 6, and a bucket 7, serving as a working tool, is provided at a forward end of the arm 5 so that the bucket can be freely rotated around a shaft (not shown).

It is so arranged that the boom 4, the arm 5, and the bucket 7 rotate on the same plane (hereinafter referred to as "rotation plane"). It is configured so that the boom 4 is moved up and down by a boom cylinder 9, the arm 5 is rotated by an arm cylinder 11, and the bucket 7 is rotated by a bucket cylinder 12. Therefore, by a cooperative operation of the rotation of the boom 4 with respect to the machine body 2, the rotation of the arm 5 with respect to the boom 4, and the rotation of the bucket 7 with respect to the arm 5, the bucket 7 can be operated in various movements such as front-to-rear movement, up-down movement, and scooping-up, and the movement of the bucket 7 is performed on the rotation plane. Further, a lower end surface 7a of the bucket 7 is designed as a flat surface, and by pressing the lower end surface 7a to the working surface or by sliding the lower end surface 7a under the pressed condition, leveling operation is carried out.

Here, the boom 4 and the arm 5 are connected together in a bendable manner, and constitute a working arm. The working arm supports the bucket 7 so that the bucket 7 can carry out a movement as required. It is to be noted that, in the excavator as described above, the working arm is so designed that the two links of boom 4 and the arm 5, are connected together in a bendable manner, while the working arm may be designed further with three bendable links. Further, as described later, each link is arranged to have a length already known.

On the machine body 2, as a position acquiring means for acquiring absolute coordinates of the machine body 2, and also, as a direction detecting means for detecting direction of the machine body 2, there are provided two GPS devices, i.e. a first GPS device 13 and a second GPS device 14 at predetermined positions, preferably along a straight line passing through the rotation center of the machine body 2. It is to be noted that three or more GPS devices may be provided. By providing the first GPS device 13 and the second GPS device 14, the absolute coordinates of the machine body 2 and the direction (azimuth) of the machine body 2, i.e. the direction of the bucket 7, is measured.

On the machine body 2, a two-axis tilt sensor 15 (see FIG. 3) for detecting tilting in each of the two horizontal directions are disposed. Also, there are provided a boom tilt sensor 16 (see FIG. 3) on the boom 4, an arm tilt sensor 17 (see FIG. 3) on the arm 5, and a bucket tilt sensor 18 (see FIG. 3) on the bucket 7 respectively. Further, although not shown in the figure, a rotation angle detector for detecting a rotation angle of the machine body 2 is disposed. It is to be noted that each of the boom tilt sensor 16, the arm tilt sensor 17, and the bucket tilt sensor 18 may be a rotation angle detector for detecting the rotation angle. Further, the boom tilt sensor 16 and the arm tilt sensor 17 make up together a working arm tilt sensor.

The first GPS device 13 and the second GPS device 14 are disclosed at a known position respectively with respect to a machine center of the machine body 2, and position of the operation room 3 is also known. As for the machine center, a rotation center of the boom 4 is used, for instance. Also, each of the length of the boom 4, the length of the arm 5, and the length from the rotation center of the bucket 7 to the forward end, and a distance from the rotation center of the bucket 7 to the center position of the bucket 7 are already known respectively.

By cooperative operation of extension and contraction of the boom cylinder 9, extension and contraction of the arm cylinder 11, and extension and contraction of the bucket cylinder 12, the bucket 7 can be moved in up-down direction, front-to-rear direction, and further rotated, and excavation work as desired can be carried out.

Figure 2:
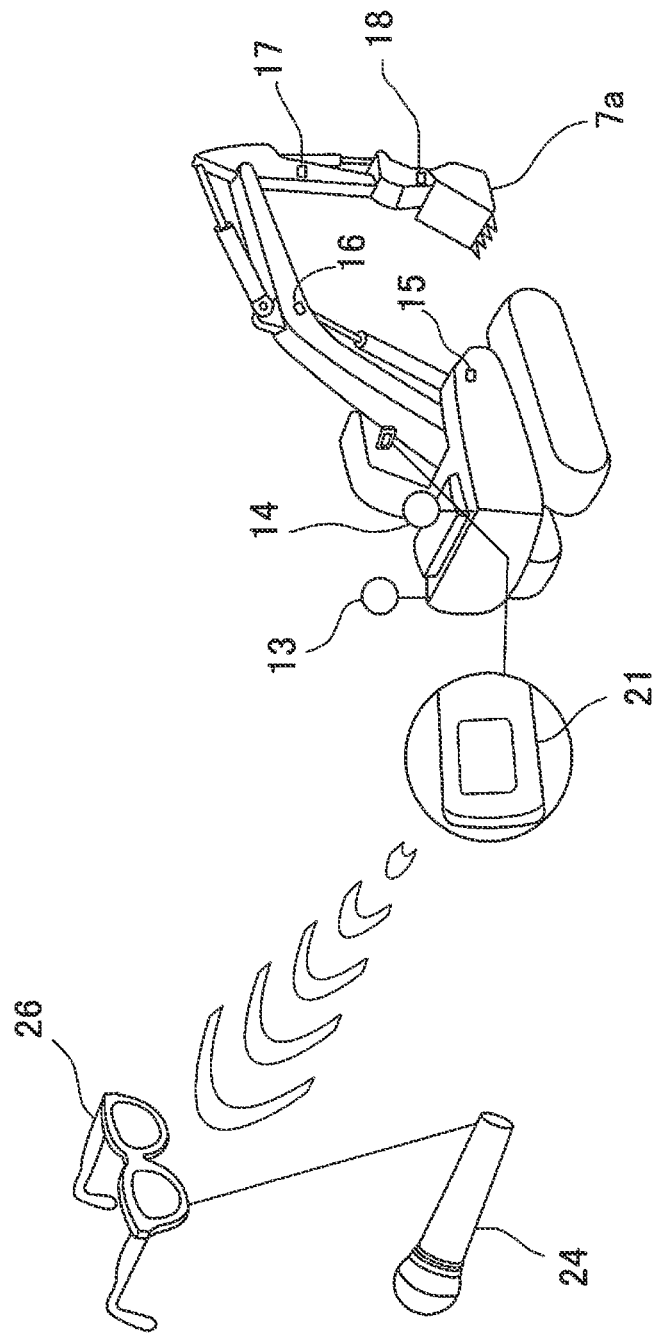
FIG. 2 is a schematical block diagram to show an embodiment, in which the present invention is applied to an excavator.
Figure 3:
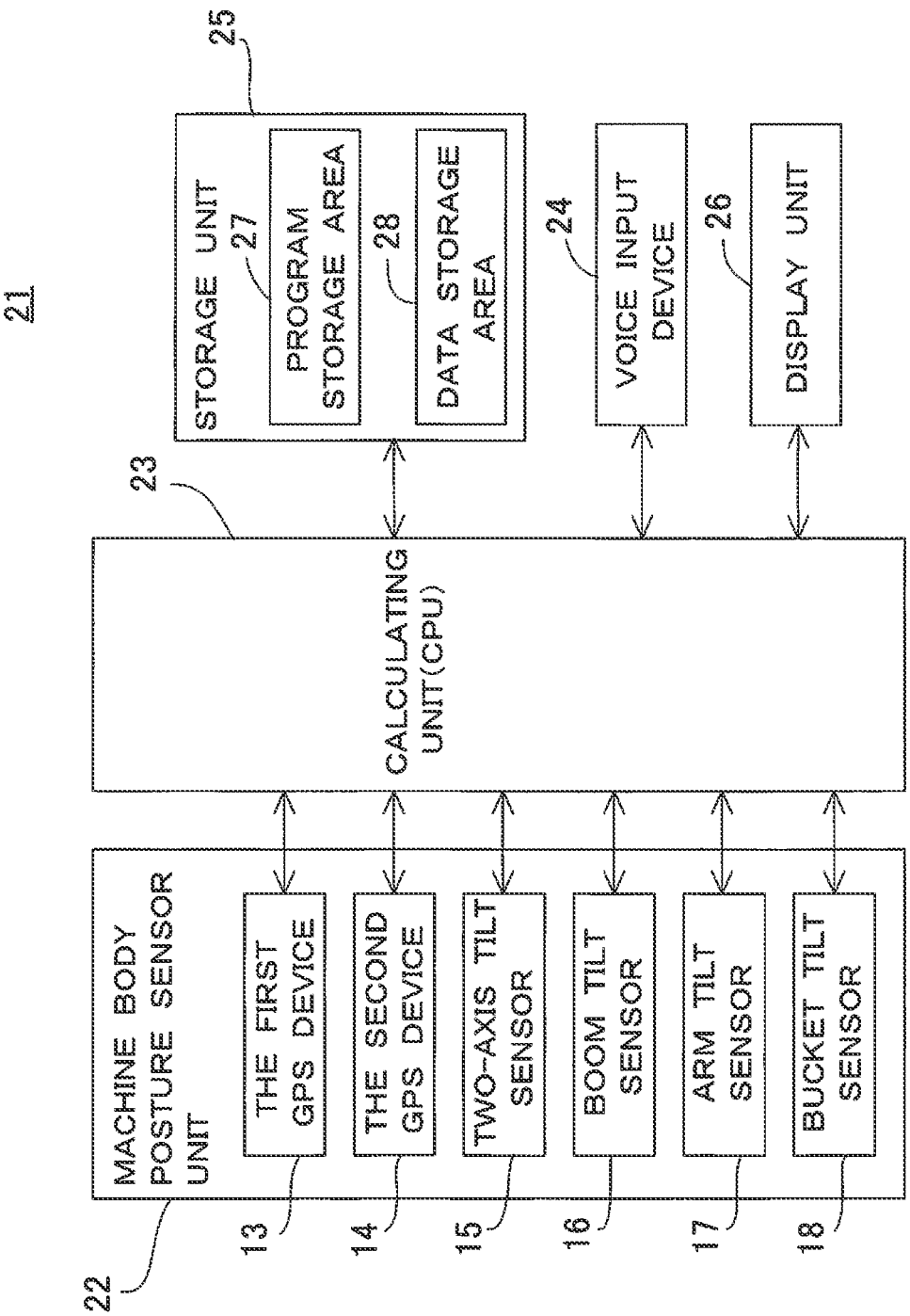
FIG. 3 is a block diagram to show a control system according to an embodiment of the invention.

Next, referring to FIG. 2 and FIG. 3, description will be given on a control device 21 of the running driving body 1.

The control device 21 comprises a machine body attitude sensor unit 22, an arithmetic unit 23, a voice input unit 24, a storage unit 25, and a display unit 26.

Further, the machine body attitude sensor unit 22 comprises the first GPS device 13, the second GPS device 14, the two-axis tilt sensor 15, the boom tilt sensor 16, the arm tilt sensor 17, and the bucket tilt sensor 18.

The storage unit 25 has a program storage area 27 and a data storage area 28. Various types of programs are stored in the program storage area 27 such as a sequence program for controlling acquisition of signals from the machine body attitude sensor unit 22 and for controlling the displaying of images to the display unit 26, an image processing program, an image display program for displaying images on the display unit 26, and a voice input program for converting the voice inputted from the voice input unit 24 such as a microphone to a driving command to the boom cylinder 9, the arm cylinder 11, and the bucket cylinder 12. In the data storage area 28, data such as working data necessary for civil engineering operation are stored. The working data comprise absolute coordinates of the working position for performing excavation work, design gradient and design height, etc. to indicate gradient and height of the lower end surface 7a of the bucket 7 when performing the excavation work.

It is to be noted that the display unit 26 in the present embodiment is a pair of 3D eyeglasses, for instance. When performing the excavation work, operator wears the 3D eyeglasses. A guidance screen is shown, where the guiding information (to be described later) is displayed, on the 3D eyeglasses.

Figure 4:
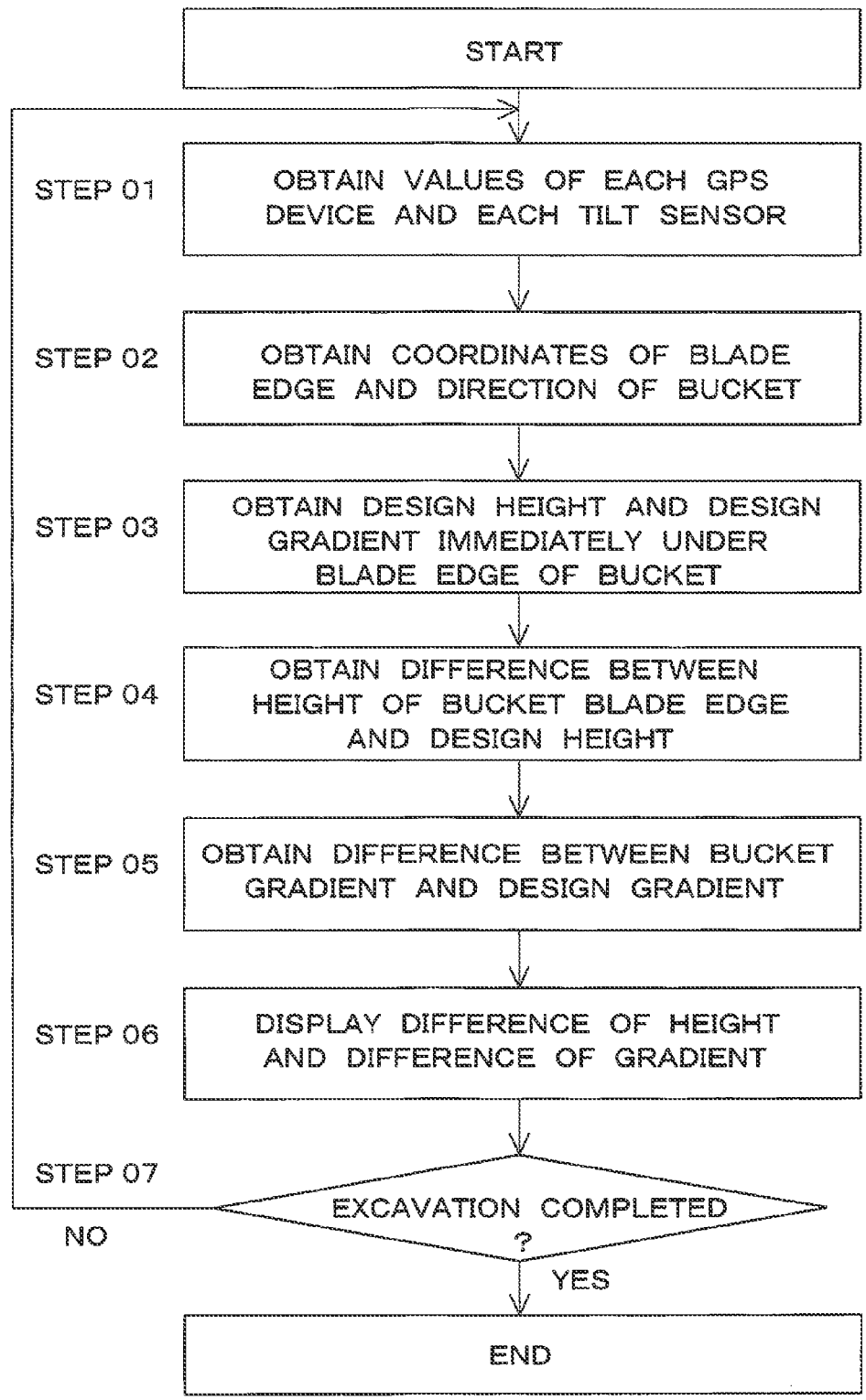
FIG. 4 is a flowchart to show an operation of an embodiment of the present invention.

Next, referring to the flowchart shown in FIG. 4, description will be given on the excavation work by using a bucket guidance display system in the present embodiment.

(Step 01) When the processing is started, the arithmetic unit 23 acquires the absolute coordinates of the machine body 2 from the first GPS device 13 and the second GPS device 14. Also, the arithmetic unit 23 acquires the tilting of the machine body 2, the tilting of the boom 4, the tilting of the arm 5, and the tilting of the bucket 7 from the two-axis tilt sensor 15, the boom tilt sensor 16, the arm tilt sensor 17 and the bucket tilt sensor 18.

(Step 02) Next, the arithmetic unit 23 calculates the absolute coordinates of the blade edge of the bucket 7 and the gradient of the lower end surface 7a (hereinafter, simply referred as "gradient") of the bucket 7 based on the absolute coordinates of the machine body 2, the tilting of the machine body 2, the tilting of the boom 4, the tilting of the arm 5, and the tilting of the bucket 7, as acquired. Also, the arithmetic unit 23 calculates the direction of the bucket 7 with respect to the working position based on the working data stored in the data storage area 28.

(Step 03) When the arithmetic unit 23 calculates the absolute coordinates of the blade edge of the bucket 7, the calculating unit 23 calculates the design height and the design gradient immediately under the coordinates of the blade edge of the bucket 7 based on the coordinates of the blade edge of the bucket 7 and the working data.

(Step 04) The arithmetic unit 23 calculates the difference between the height of the blade edge of the bucket 7 and design height based on the height of the blade edge of the bucket 7 calculated in Step 02, and based on the design height immediately under the blade edge of the bucket 7 calculated in Step 03.

(Step 05) Next, the arithmetic unit 23 calculates the difference between the gradient of the bucket 7 and the design gradient and the difference between the direction of the bucket 7 and the direction of the working position, based on the gradient and direction of the bucket 7 calculated in Step 02 and based on the design gradient (the design gradient of the working position) immediately under the blade edge of the bucket 7 calculated in Step 03.

Figure 5:
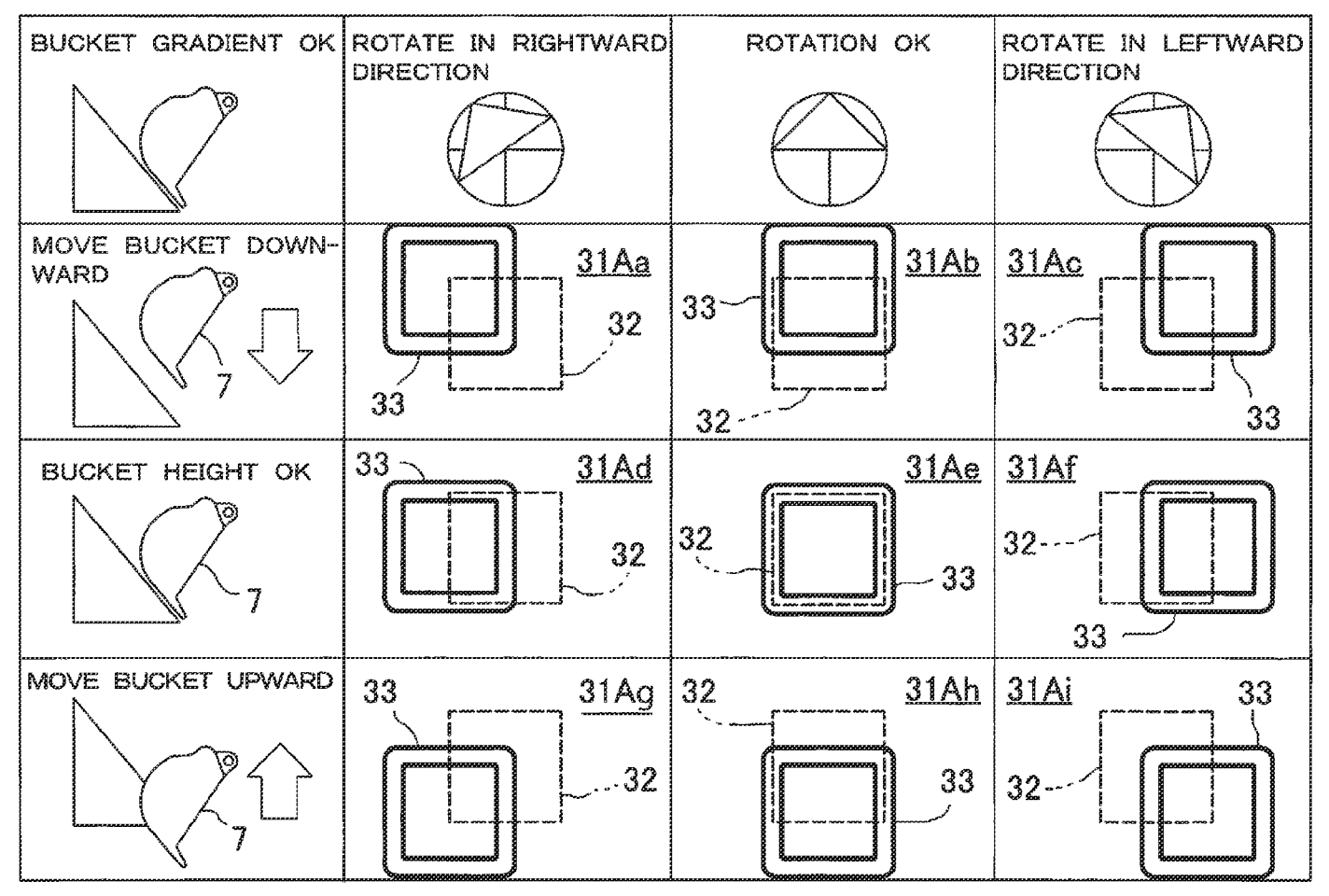
Figure 6:
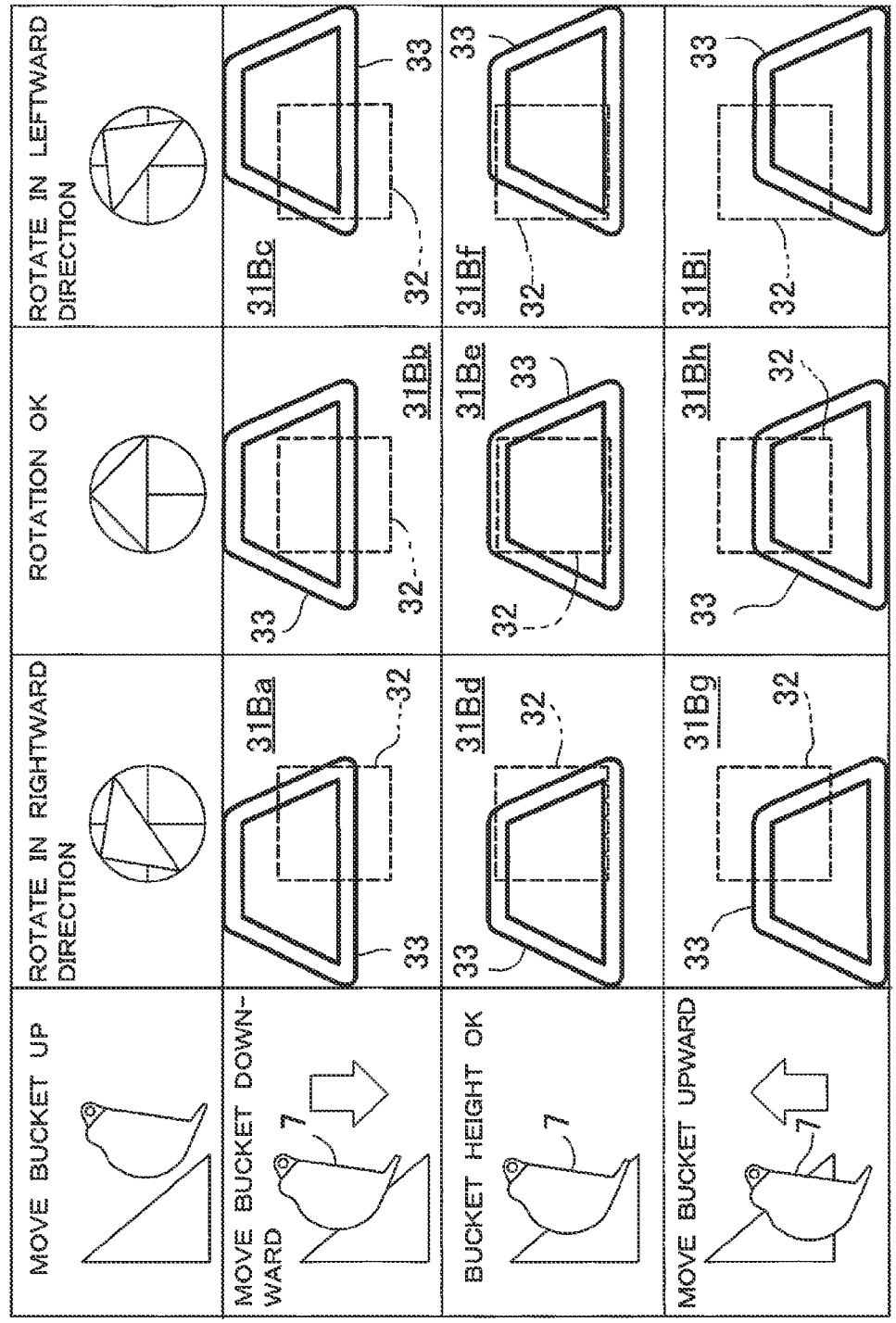
FIG. 6 shows display examples of guidance screens according to the first embodiment of the present invention, showing a case where the design gradient is higher than the gradient of the working tool.
Figure 7:
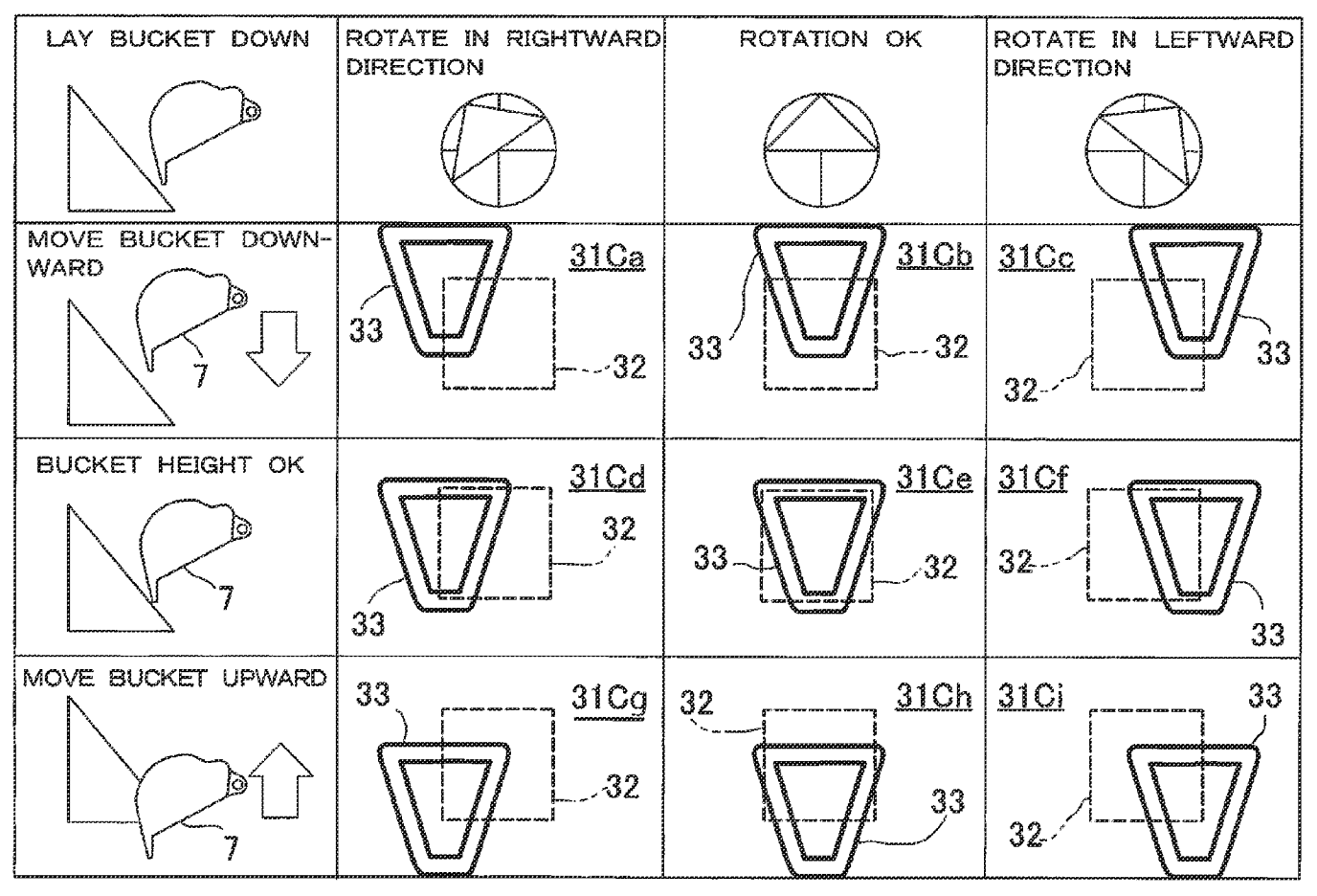

(Step 06) The arithmetic unit 23 prepares a guidance screen 31 to guide the bucket 7 to the working position as shown in FIG. 5 to FIG. 7, for instance, and displays on the display unit 26, based on the difference between the height of the blade edge of the bucket 7 calculated in Step 04 and design height, and also, based on the difference between the gradient of the bucket 7 calculated in Step 05 and design gradient, and based on the difference between the direction of the bucket 7 and direction of the working position.

It is to be noted that the procedure in Step 01 to Step 06 as described above is successively carried out during the excavation operation, and the present status of the machine body 2 and the bucket 7—that is, the direction of the bucket 7, and the height and the gradient of the bucket 7—are displayed on the display unit 26 in real time.

Each of FIG. 5 to FIG. 7 shows the guidance screens 31 according to the first embodiment of the present invention. As the guidance screens 31, one of the guidance screens 31Aa to 31Ai, 31Ba to 31Bi, and 31Ca to 31Ci is to be displayed, for instance.

In the first embodiment, as the guiding information, a working position mark 32 which indicate a working position, which is a target position of the bucket 7, is displayed by a broken-line square at the center of each of the guidance screens 31. Also, a bucket mark 33 to indicate the condition of the bucket 7 is displayed on each of the guidance screens 31 by a dual-line quadrangle. Length of the upper edge of the bucket mark 33 is always constant, and the length of the lower edge, i.e. a distance between two points adjacent to each other is variable, and the standard form of the bucket mark 33 is a square.

FIG. 5 shows the guidance screens 31Aa to 31Ai, and the guidance screens 31Aa to 31Ai are display examples of the guidance screen 31 when the gradient of the bucket 7 and the design gradient in the working data is coincident. Here, in a case where the gradient of the bucket 7 and the design gradient in the working data are coincident, the bucket mark 33 is shown as a square of standard shape. It is to be noted that the size of the square is varied so that the working position mark 32 and the bucket mark 33 do not overlap.

As shown in FIG. 5, in a case where the blade edge of the bucket 7 is at a position higher than the design height in the working data, the bucket mark 33 is displayed at the upper side compared with the working position mark 32, as shown in the guidance screens 31Aa to 31Ac. In a case where the blade edge of the bucket 7 coincide with the design height in the working data, the bucket mark 33 is shown at the equal position in up-down direction as the working position mark 32, as shown in the guidance screens 31Ad to 31Af. In a case where the blade edge of the bucket 7 is at a position lower than the design height, the bucket mark 33 is shown at the lower side than the working position mark 32, as shown in the guidance screens 31Ag to 31Ai.

Further, when the direction of the bucket 7 is directed in leftward direction compared with the working position, the bucket mark 33 is displayed on the left side of the working position mark 32, as shown in the guidance screens 31Aa, 31Ad, and 31Ag. When the direction of the bucket 7 coincide with the working position, the bucket mark 33 is displayed so that the position in left-to-right direction is equal to the position of the working position mark 32, as shown in the guidance screens 31Ab, 31Ae, and 31Ah. When the bucket mark 33 is directed in rightward direction compared with the working position, the bucket mark 33 is displayed on the right side of the working position mark 32, as shown in the guidance screens 31Ac, 31Af, and 31Ai.

With respect to the position in left-to-right direction of the bucket mark 33 as shown in the guidance screen 31, it is designed so that a direction, where the amount of rotation necessary in order to make the bucket 7 face directly to the working position is smaller, is selected. That is, if the amount of rotation when the machine body 2 is rotated in rightward direction is smaller than the amount of rotation when the machine body 2 is rotated in leftward direction, the bucket mark 33 is displayed on the left side compared with the working position mark 32. Also, if the amount of rotation when the machine body 2 is rotated in leftward direction, is smaller than the amount of rotation when the machine body 2 is rotated in rightward direction, the bucket mark 33 is displayed on the right side compared with the working position mark 32.

FIG. 6 shows the guidance screens 31Ba to 31Bi, and the guidance screens 31Ba to 31Bi are display examples of the guidance screen 31 when the design gradient in the working data is larger than the gradient of the bucket 7. In this case, the standard shape of the bucket mark 33 is shown as the shape of isosceles trapezoid, which has its lower edge longer than the upper edge, etc.

As shown in FIG. 6, when the blade edge of the bucket 7 is at a position higher than the design height, the bucket mark 33 is shown at an upper position compared with the working position mark 32, as shown in the guidance screens 31Ba to 31Bc. When the blade edge of the bucket 7 coincide with the design height, the bucket mark 33 is shown at a position where the position in up-down direction is equal to that of the working position mark 32, as shown in the guidance screens 31Bd to 31Bf. When the blade edge of the bucket 7 is at a position lower than the design height, the bucket mark 33 is shown at a lower position compared with the working position mark 32, as shown in the guidance screens 31Bg to 31Bi.

Further, when the direction of the bucket 7 is directed in leftward direction compared with the working position, the bucket mark 33 is shown on the left side compared with the working position mark 32, as shown in the guidance screens 31Ba, 31Bd and 31Bg. When the direction of the bucket 7 coincide with the working position, the bucket mark 33 is displayed in a condition such that the bucket mark 33 coincide with the working position mark 32 in left-to-right position, as shown in the guidance screens 31Bb, 31Be and 31Bh. When the direction of the bucket 7 is directed in rightward direction compared with the working position, the bucket mark 33 is displayed on the right side compared with the working position mark 32, as shown in the guidance screens 31Bc, 31Bf and 31Bi.

FIG. 7 shows the guidance screens 31Ca to 31Ci, and the guidance screen 31Ca to 31Ci are display examples of the guidance screen 31 when the gradient of the bucket 7 is higher than the design gradient in the working data. In this case, the standard shape of the bucket mark 33 is given as the shape of an inverted isosceles trapezoid, which has the length of the lower edge shorter than the upper edge.

As shown in FIG. 7, when the blade edge of the bucket 7 is at a position higher than the design height, the bucket mark 33 is displayed at an upper position compared with the working position mark 32, as shown in the guidance screens 31Ca to 31Cc. When blade edge of the bucket 7 coincide with the design height, the bucket mark 33 is displayed in a condition where the position of the bucket mark 33 in up-down direction coincide with the working position mark 32, as shown in the guidance screens 31Cd to 31Cf. When the blade edge of the bucket 7 is at a position lower than the design height, the bucket mark 33 is displayed at a position lower than the working position mark 32, as shown in the guidance screens 31Cg to 31Ci.

When the bucket 7 is directed in leftward direction compared with the working position, the bucket mark 33 is displayed on the left side compared with the working position mark 32, as shown in the guidance screens 31Ca, 31Cd, and 31Cg. When the direction of the bucket 7 coincide with the working position, the bucket mark 33 is displayed in a condition where the bucket mark 33 with its position in left-to-right direction coincide with the working position mark 32 as shown in the guidance screens 31Cb, 31Ce and 31Ch. When the direction of the bucket 7 is directed in rightward direction compared with the working position, the bucket mark 33 is displayed on the right side compared with the working position mark 32, as shown in the guidance screens 31Cc, 31Cf, and 31Ci.

(Step 07) An operator rotates the machine body 2 and moves the bucket 7 based on the position of the bucket mark 33 in up-down direction, on the position in left-to-right direction, and on the shape as shown in the guidance screens 31.

For instance, in a case where the guidance screen 31Ba is displayed on the display unit 26, first of all, the bucket 7 is moved up so that the length of the lower edge of the bucket mark 33 coincide with the length of the upper edge. Next, the machine body 2 is rotated in rightward direction so that the position of the bucket mark 33 in left-to-right direction coincide with the working position mark 32. Finally, the bucket 7 is moved down so that the position of the bucket mark 33 in up-down direction coincide with the working position mark 32. By the operation of the bucket 7, the bucket mark 33 coincide with the working position mark 32 as shown in the guidance screen 31Ae, and the bucket 7 is guided to the working position. Excavating operation is carried out under the condition where the bucket mark 33 coincide with the working position mark 32. By finishing the excavating operation, the series of processes are completed.

As described above, in the first embodiment, three types of information such as the direction of the bucket, the gradient of the bucket 7, and the height of the bucket 7 with respect to the working position, as shown in individual screens, in the Japanese Patent Publication JP-A-2012-255286, can be displayed on a single screen according to the change of shape of the bucket mark 33 shown by a quadrangle and according to the difference of position with respect to the working position mark 32.

Therefore, it is not necessary for the operator to combine the informations to guide the bucket 7 to the target position and to carry out the excavation operation, so the operator can easily and intuitively identify the guiding information. This contributes to the improvement of the working efficiency in the excavating operation.

Also, 3D eyeglasses are used as the display unit 26 in the first embodiment, so the operator can carry out the excavating operation while watching the bucket 7 and the guidance screen 31 at the same time, and this is contributes to the improvement of the working efficiency.

It is to be noted that, in the first embodiment, either one of the guidance screens 31Aa to 31Ai, 31Ba to 31Bi, and 31Ca to 31Ci is displayed, while it may be so arranged that the direction of the bucket 7 with respect to the design position, and the condition of the bucket 7 with respect to the design gradient, etc. may be displayed at the same time as shown in FIG. 5 to FIG. 7.

Next, referring to FIG. 8 to FIG. 10, description will be given on a guidance screen 34 according to a second embodiment of the present invention. As the guidance screens 34, it is so designed that either one of the guidance screens 34Aa to 34Ai, 34Ba to 34Bi, and 34Ca to 34Ci to be described below is displayed, for instance.

In the second embodiment, a working position mark 35 to indicate the working position, which is a target position of the bucket 7, is shown by a broken-line circle at the center of the guidance screen 34 as the guiding information. Also, a bucket mark 36 to show the condition of the bucket 7 is displayed by a dual-line circle, and the standard shape of the bucket mark 36 is a shape which coincide with the working position mark 35, i.e. a circle. Further, the bucket mark 36 and the working position mark 35 are designed with different diameters respectively so that the bucket mark 36 and the working position mark 35 do not overlap. Also, the length of the diameter of the bucket mark 36 in up-down direction is always constant, and the length of the diameter in left-to-right direction is variable.

FIG. 8 shows the guidance screens 34Aa to 34Ai, and the guidance screens 34Aa to 34Ai are display examples of the guidance screen 34 when the gradient of the bucket 7 coincide with the design gradient in the working data. Here, when the gradient of the bucket 7 coincide with the design gradient in the working data, the bucket mark 36 is given as a circle of standard shape.

As shown in FIG. 8, when the blade edge of the bucket 7 is at a position higher than the design height, the bucket mark 36 is displayed on an upper position compared with the working position mark 35, as shown in the guidance screens 34Aa to 34Ac. When the blade edge of the bucket 7 coincide with the design height, the bucket mark 36 is displayed in a condition such that the bucket mark 36 coincide with the working position mark 35 in up-down direction, as shown in the guidance screens 34Ad to 34Af. When the blade edge of the bucket 7 is at a position lower than the design height, the bucket mark 36 is displayed at a lower side compared with the working position mark 35, as shown in the guidance screens 34Ag to 34Ai.

Also, when the direction of the bucket 7 is directed in leftward direction compared with the working position, the bucket mark 36 is displayed on the left side compared with the working position mark 35, as shown in the guidance screens 34Aa, 34Ad and 34Ag. When the direction of the bucket 7 coincide with the working position, the bucket mark 36 is displayed in a condition such that the bucket mark 36 coincide with the working position mark 35 in left-to-right direction, as shown in the guidance screens 34Ab, 34Ae and 34Ah. When the direction of the bucket 7 is directed in rightward direction compared with the working position, the bucket mark 36 is displayed on the right side compared with the working position mark 35, as shown in the guidance screens 34Ac, 34Af and 34Ai.

Figure 9:
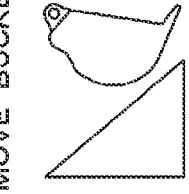
FIG. 9 shows display examples of guidance screens according to the second embodiment of the present invention, showing a case where the design gradient is higher than the gradient of the working tool.

FIG. 9 shows the guidance screens 34Ba to 34Bi, and the guidance screens 34Ba to 34Bi are display examples of the guidance screens 34 when the design gradient in the working data is larger than the gradient of the bucket 7. In this case, the standard shape of the bucket mark 36 is given in a form of an ellipse, which has its diameter in left-to-right direction longer than the diameter in up-down direction.

As shown in FIG. 9, when the blade edge of the bucket 7 is at a position higher than the design height, the bucket mark 36 is displayed on an upper side compared with the working position mark 35, as shown in the guidance screens 34Ba to 34Bc. When the blade edge of the bucket 7 coincide with the design height, the bucket mark 36 is displayed in such a manner that the bucket mark 36 coincide with the working position mark 35 in up-down direction, as shown in the guidance screens 34Bd to 34Bf. When the blade edge of the bucket 7 is at a position lower than the design height, the bucket mark 36 is displayed at a position lower than the working position mark 35, as shown in the guidance screens 34Bg to 34Bi.

Also, when the direction of the bucket 7 is directed in leftward direction compared with the working position, the bucket mark 36 is displayed on the left side compared with the working position mark 35, as shown in the guidance screens 34Ba, 34Bd and 34Bg. When the direction of the bucket 7 coincide with the working position, the bucket mark 36 is displayed under such condition that the bucket mark 36 coincide with working position mark 35 left-to-right direction as shown in the guidance screens 34Bb, 34Be and 34Bh. When the direction of the bucket 7 is directed in the rightward direction compared with the working position, the bucket mark 36 is displayed on the right side compared with the working position mark 35, as shown in the guidance screens 34Bc, 34Bf, and 34Bi.

Figure 10:
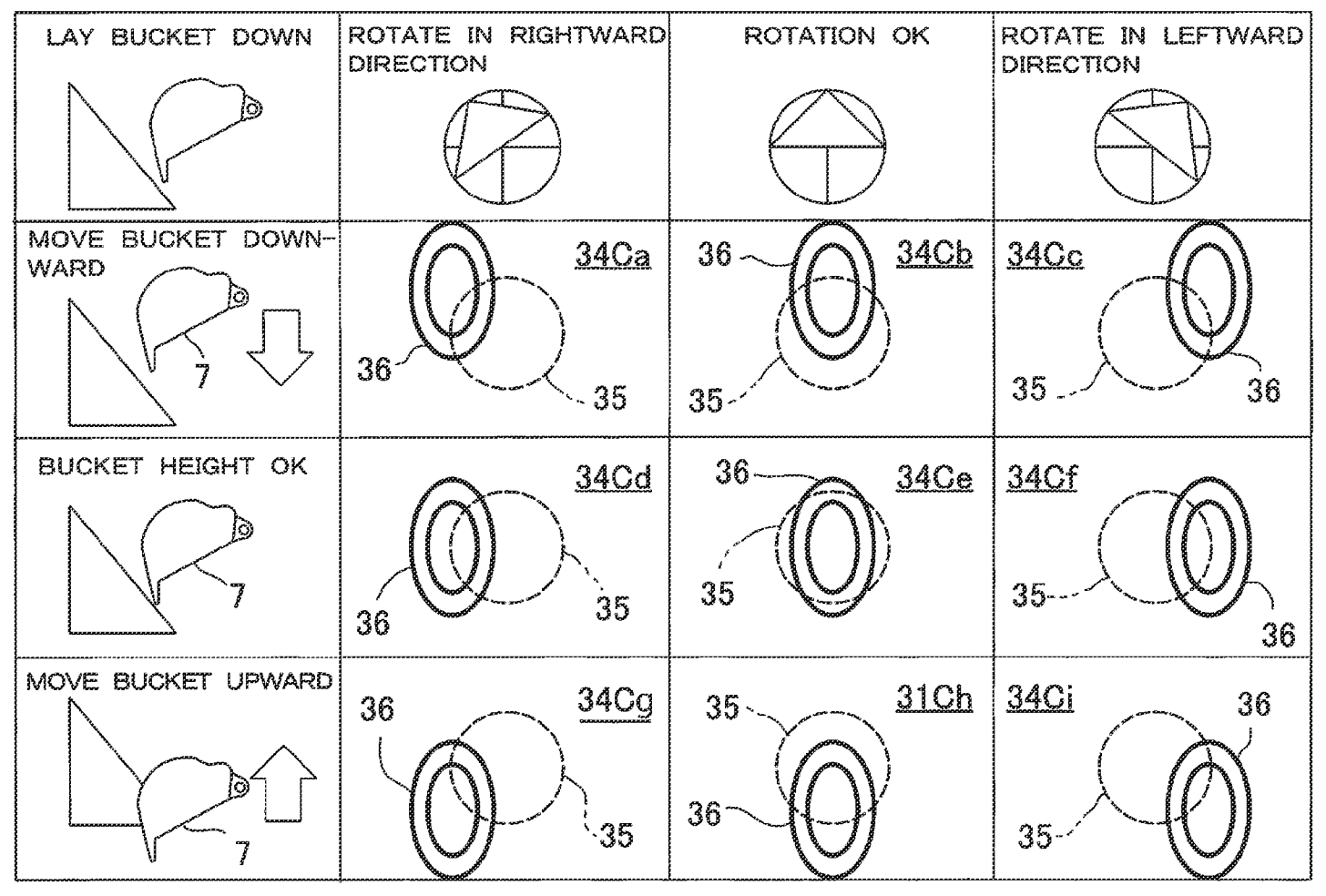

FIG. 10 shows the guidance screens 34Ca to 34Ci, and the guidance screens 34Ca to 34Ci are display examples of the guidance screens 34 when the gradient of the bucket 7 is larger than the design gradient in the working data. In this case, the standard shape of the bucket mark 36 is shown in form of an ellipse, which has a diameter in left-to-right direction shorter than the diameter in up-down direction.

In a case where the blade edge of the bucket 7 is at a position higher than the design height as shown in FIG. 10, the bucket mark 36 is displayed at an upper side compared with the working position mark 35, as shown in the guidance screens 34Ca to 34Cc. When the blade edge of the bucket 7 coincide with the design height, the bucket mark 36 is displayed in a condition such that the bucket mark 36 coincide with the working position mark 35 in up-down direction, as shown in the guidance screens 34Cd to 34Cf. When the blade edge of the bucket 7 is at a position lower than the design height, the bucket mark 36 is displayed at a lower side than the working position mark 35, as shown in the guidance screens 34Cg to 34Ci.

Also, when the direction of the bucket 7 is directed in the leftward direction compared with the working position, the bucket mark 36 is displayed at a left side compared with the working position mark 35, as shown in the guidance screens 34Ca, 34Cd, and 34Cg. When the direction of the bucket 7 coincide with the working position, the bucket mark 36 is displayed in such a condition that the position of the bucket mark 36 coincide with the working position mark 35 in left-to-right direction, as shown in the guidance screens 34Cb, 34Ce and 34Ch. When the direction of the bucket 7 is directed in the rightward direction compared with the working position, the bucket mark 36 is displayed at the right side compared with the working position mark 35, as shown in the guidance screens 34Cc, 34Cf and 34Ci.

It is noted that in the second embodiment, it is set in such a manner that the length of the diameter in up-down direction is constant while the length of the diameter in left-to-right direction is variable, while it is needless to say that the length of the diameter in left-to-right direction can be set as constant, and the length of diameter in up-down direction can be set as variable.

Next, referring to FIG. 11 to FIG. 13, description will be given on guidance screens 37 according to a third embodiment of the present invention. As the guidance screens 37, either one of the guidance screens 37Aa to 37Ai, 37Ba to 37Bi, or 37Ca to 37Ci to be described later is displayed, for instance.

In the third embodiment, a working position mark 38 to indicate the working position, which is a target position of the bucket 7, is displayed by an isosceles triangle of broken line at the center of the guidance screens 37 as the guiding information. Further, a bucket mark 39 to indicate the condition of the bucket 7 is shown by an isosceles triangle of dual-line, and the standard form of the bucket mark 39 is set to an isosceles triangle of the same form. The bucket mark 39 is always constant in height, and the length of base is variable, i.e. the distance between two points adjacent to each other is variable.

Figure 11:
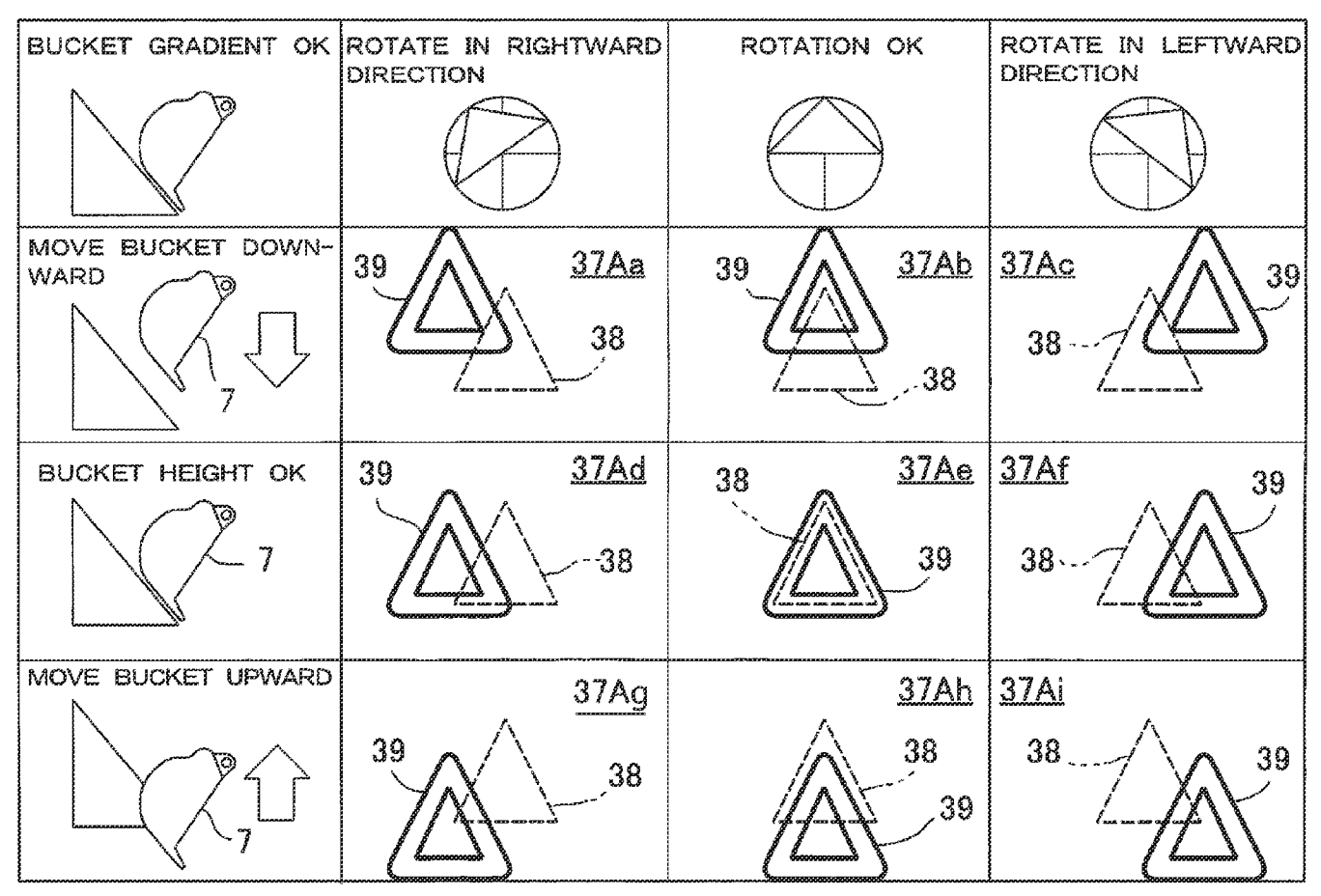

FIG. 11 shows the guidance screens 37Aa to 37Ai, and the guidance screens 37Aa to 37Ai are display examples of the guidance screens 37 in a case where the gradient of the bucket 7 coincide with the design gradient in the working data. Here, if the gradient of the bucket 7 coincide with the design gradient in the working data, the bucket mark 39 to be displayed is given as an isosceles triangle of standard form.

As shown in FIG. 11, when the blade edge of the bucket 7 is at a position higher than the design height, the bucket mark 39 is displayed at an upper side compared with the working position mark 38, as shown in the guidance screens 37Aa to 37Ac. When the blade edge of the bucket 7 coincide with the design height, the bucket mark 39 is displayed in a condition where the working position mark 38 coincide in up-down direction, as shown in the guidance screens 37Ad to 37Af. When the blade edge of the bucket 7 is at a position lower than the design height, the bucket mark 39 is displayed at a lower side compared with the working position mark 38, as shown in the guidance screens 37Ag to 37Ai.

Also, when the direction of the bucket 7 is directed in the leftward direction compared with the working position, the bucket mark 39 is displayed on the left side compared with the working position mark 38, as shown in the guidance screens 37Aa, 37Ad, and 37Ag. When the direction of the bucket 7 coincide with the working position, the bucket mark 39 is displayed under the condition that the working position mark 38 coincide with the bucket mark 39 in left-to-right direction, as shown in the guidance screens 37Ab, 37Ae and 37Ah. When the direction of the bucket 7 is directed in the rightward direction compared with the working position, the bucket mark 39 is displayed at the right side compared with the working position mark 38, as shown in the guidance screens 37Ac, 37Af and 37Ai.

Figure 12:
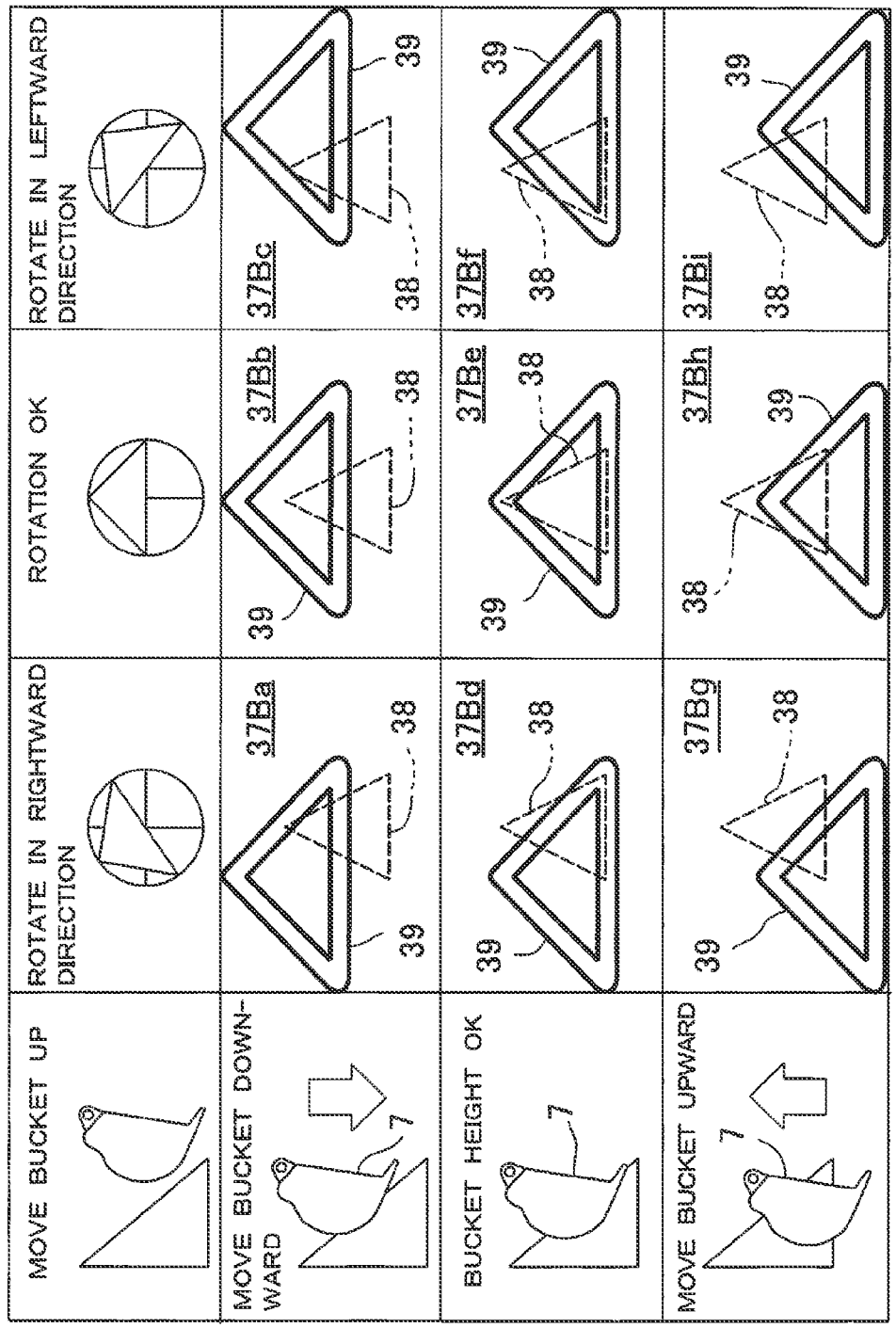
FIG. 12 shows display examples of guidance screens according to the third embodiment of the present invention, showing a case where the design gradient is higher than the gradient of the working tool.

FIG. 12 shows the guidance screens 37Ba to 37Bi, and the guidance screens 37Ba to 37Bi are display examples of the guidance screens 37 when the design gradient in the working data is larger than the gradient of the bucket 7. In this case, the standard shape of the bucket mark 39 displayed by an isosceles triangle, which has the length of the base longer than that of the working position mark 38.

As shown in FIG. 12, when the blade edge of the bucket 7 is at a position higher than the design height, the bucket mark 39 is displayed at the upper side compared with the working position mark 38, as shown in the guidance screens 37Ba to 37Bc. When the blade edge of the bucket 7 coincide with the design height, the bucket mark 39 is displayed in a condition where the bucket mark 39 coincide with the working position mark 38 in up-down direction, as shown in the guidance screens 37Bd to 37Bf. When the blade edge of the bucket 7 is at a position lower than the design height, the bucket mark 39 is displayed at the lower side compared with the working position mark 38, as shown in the guidance screens 37Bg to 37Bi.

Also, when the direction of the bucket 7 is directed in leftward direction compared with the working position, the bucket mark 39 is displayed at a position in the leftward direction compared with the working position mark, as shown in the guidance screens 37Ba, 37Bd and 37Bg. When the direction of the bucket 7 coincide with the working position, the bucket mark 39 is displayed in a condition where the bucket mark 39 coincide with the working position mark 38 in left-to-right direction, as shown in the guidance screens 37Bb, 37Be and 37Bh. When the direction of the bucket 7 is directed in rightward direction compared with the working position, the bucket mark 39 is displayed at the right side compared with the working position mark 38, as shown in the guidance screens 37Bc, 37Bf and 37Bi.

Figure 13:
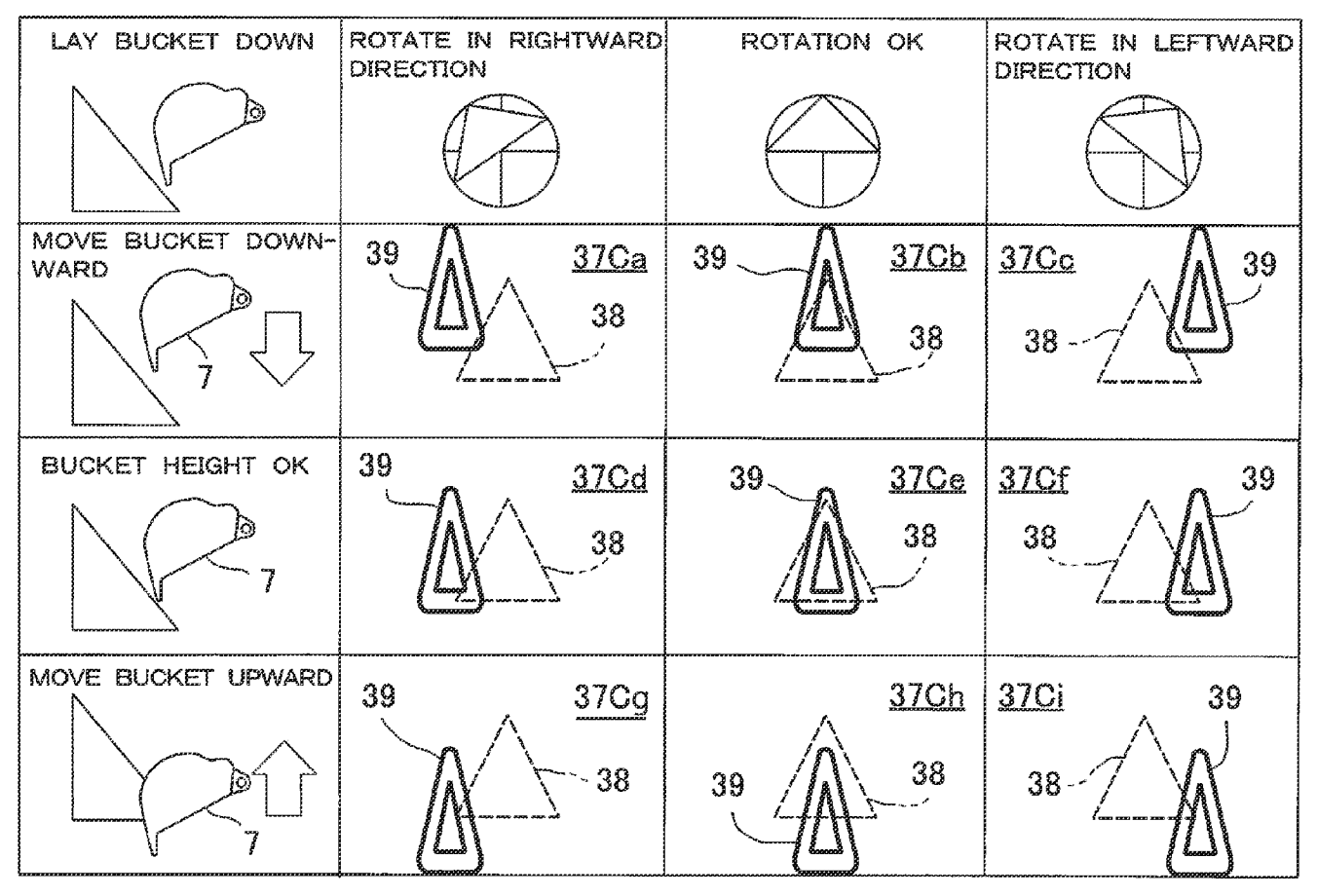

FIG. 13 shows the guidance screens 37Ca to 37Ci, and the guidance screens 37Ca to 37Ci are display examples of the guidance screen 37 in a case where the gradient of the bucket 7 is larger than the design gradient in the working data. In this case, the standard shape of the bucket mark 39 is given as an isosceles triangle, where the length of the base is shorter than that of the working position mark 38.

As shown in FIG. 13, when the blade edge of the bucket 7 is at a position higher than the design height, the bucket mark 39 is displayed at the upper side compared with the working position mark 38, as shown in the guidance screens 37Ca to 37Cc. When the blade edge of the bucket 7 coincide with the design height, the bucket mark 39 is displayed in such a condition that the bucket mark 39 coincide with the working position mark 38 in up-down direction, as shown in the guidance screens 37Cd to 37Cf. When the blade edge of the bucket 7 is at a position lower than the design height, the bucket mark 39 is displayed at the lower side compared with the working position mark 38, as shown in the guidance screens 37Cg to 37Ci.

Also, when the direction of the bucket 7 is directed in leftward direction compared with the working position, the bucket mark 39 is displayed at the left side compared with the working position mark 38, as shown in the guidance screens 37Ca, 37Cd and 37Cg. When the direction of the bucket 7 coincide with the working position, the bucket mark 39 is displayed in such a condition that the bucket mark 39 coincide with the working position mark 38 in left-to-right direction, as shown in the guidance screens 37Cb, 37Ce and 37Ch. When the direction of the bucket 7 is directed in rightward direction compared with the working position, the bucket mark 39 is displayed at a position on the right side compared with the working position mark 38, as shown in the guidance screens 37Cc, 37Cf and 37Ci.

Next, referring to FIG. 14 to FIG. 16, description will be given on guidance screens 41 in a fourth embodiment of the present invention. As the guidance screens 41, either one of the guidance screens 41Aa to 41Ai, 41Ba to 41Bi, and 41Ca to 41Ci to be described later is displayed, for instance.

In the fourth embodiment, a working position mark 42 to indicate the working position, which is a target position of the bucket 7 as guiding information, is displayed as a trapezoid of broken-line at the center of the guidance screens 41. Also, a bucket mark 43 to indicate the condition of the bucket 7 is displayed in form of an isosceles trapezoid of dual line, and a standard form of the bucket mark 43 is given as an isosceles trapezoid of the same form as that of the working position mark 42. The bucket mark 43 has the length of its upper edge always constant, while the length of the lower edge is variable, i.e. a distance between two points adjacent to each other of the lower edge is variable.

Figure 14:
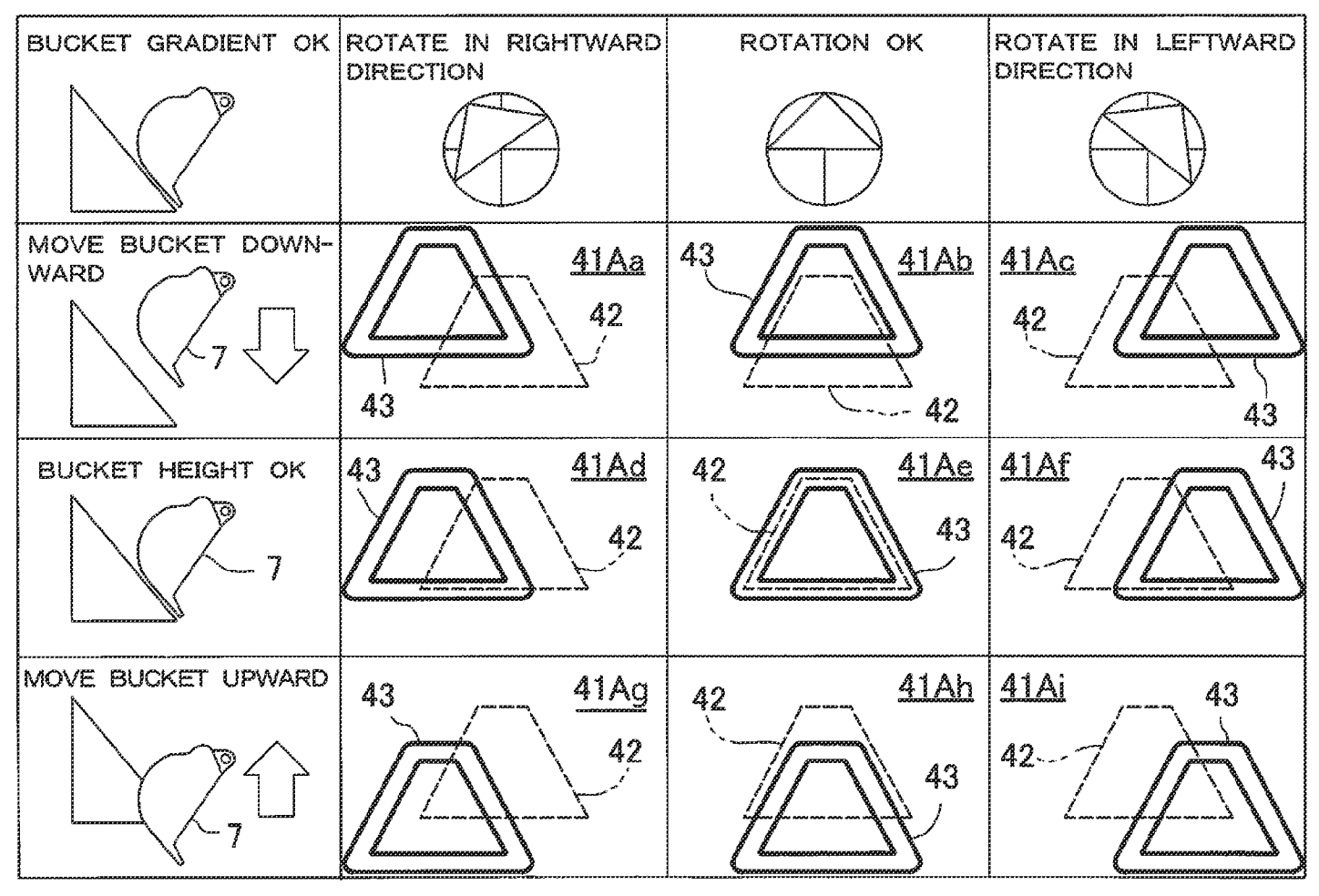

FIG. 14 shows the guidance screens 41Aa to 41Ai, and the guidance screens 41Aa to 41Ai are display examples of the guidance screens 41 when the gradient of the bucket 7 coincide with the design gradient in the working data. In this case, when the gradient of the bucket 7 coincide with the design gradient in the working data, the bucket mark 43 to be displayed is given as an isosceles trapezoid of standard form.

As shown in FIG. 14, when the blade edge of the bucket 7 is at a position higher than the design height, the bucket mark 43 is displayed at the upper side compared with the working position mark 42, as shown in the guidance screens 41Aa to 41Ac. When the blade edge of the bucket 7 coincide with the design height, the bucket mark 43 is displayed in such a condition where the bucket mark 43 coincide with the working position mark 42 in up-down direction, as shown in the guidance screens 41Ad to 41Af. When the blade edge of the bucket 7 is at a position lower than the design height, the bucket mark 43 is displayed at the lower side compared with the working position mark 42, as shown in the guidance screens 41Ag to 41Ai.

Also, when the direction of the bucket 7 is directed in the leftward direction compared with the working position, the bucket mark 43 is displayed at a position on the left side compared with the working position mark 42, as shown in the guidance screens 41Aa, 41Ad and 41Ag. When the direction of the bucket 7 coincide with the working position, the bucket mark 43 is displayed in such a condition that the position of the bucket mark 43 coincides with the working position mark 42 in left-to-right direction, as shown in the guidance screens 41Ab, 41Ae and 41Ah. When the direction of the bucket 7 is directed in the rightward direction compared with the working position, the bucket mark 43 is displayed at a position on the right side compared with the position of the working position mark 42, as shown in the guidance screens 41Ac, 41Af and 41Ai.

Figure 15:
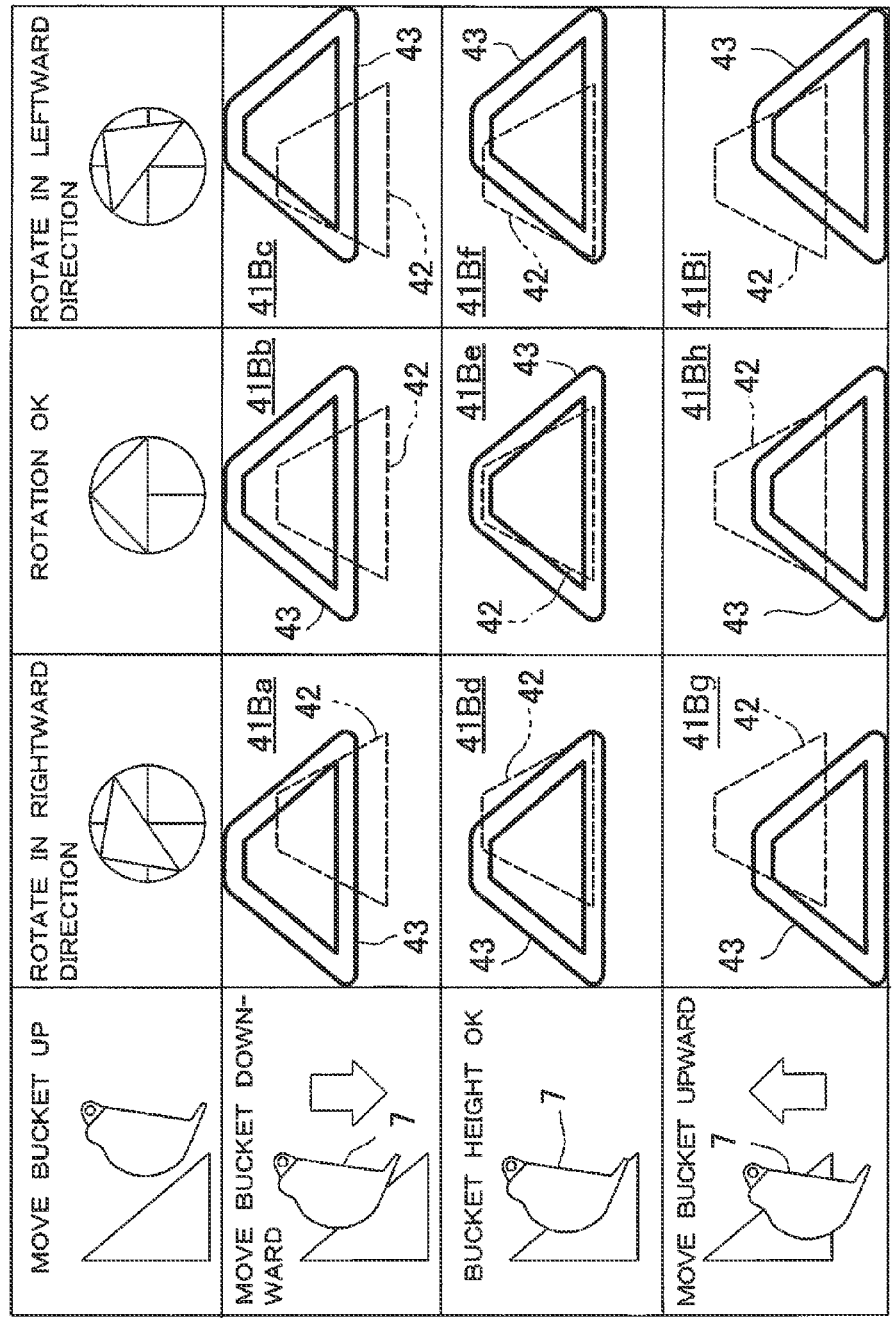
FIG. 15 shows display examples of guidance screens according to the fourth embodiment of the present invention, showing a case where the design gradient is higher than the gradient of the working tool.

FIG. 15 shows the guidance screens 41Ba to 41Bi, and guidance screens 41Ba to 41Bi are display examples of the guidance screens 41 in a case where the design gradient in the working data is larger than the gradient of the bucket 7. In this case, the standard form of the bucket mark 43 is given by a form of an isosceles trapezoid, where the length of the lower edge is longer than that of the working position mark 42.

As shown in FIG. 15, when the blade edge of the bucket 7 is at a position higher than the design height, the bucket mark 43 is displayed at the upper side compared with the working position mark 42, as shown in the guidance screens 41Ba to 41Bc. When the blade edge of the bucket 7 coincide with the design height, the bucket mark 43 is displayed in such a condition where the position of the bucket mark 43 coincide with the working position mark 42 in up-down direction, as shown in the guidance screens 41Bd to 41Bf. When the blade edge of the bucket 7 is at a position lower than the design height, the bucket mark 43 is displayed at the lower side compared with the working position mark 42, as shown in the guidance screens 41Bg to 41Bi.

Also, when the direction of the bucket 7 is directed in leftward direction compared with the working position, the bucket mark 43 is displayed at the left side compared with the working position mark 42, as shown in the guidance screens 41Ba, 41Bd and 41Bg. When the direction of the bucket 7 coincide with the working position, the bucket mark 43 is displayed with the position of the bucket mark 43 to coincide with the working position mark 42 in left-to-right direction, as shown in the guidance screens 41Bb, 41Be and 41Bh. When the direction of the bucket 7 is directed in rightward direction compared with the working position, the bucket mark 43 is displayed at the right side compared with the position of the working position mark 42, as shown in the guidance screens 41Bc, 41Bf and 41Bi.

Figure 16:
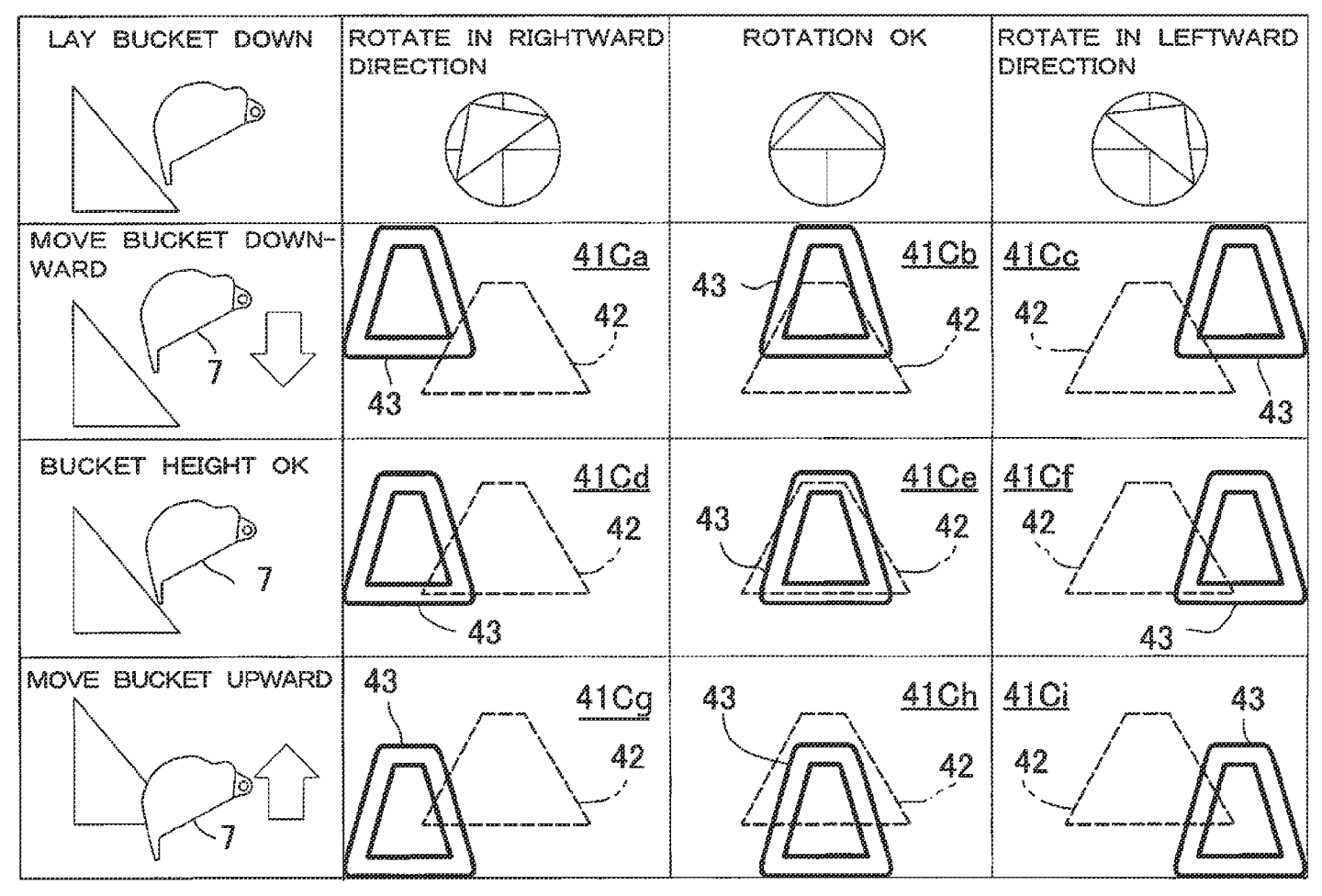

FIG. 16 shows the guidance screens 41Ca to 41Ci, and the guidance screens 41Ca to 41Ci are display examples of the guidance screens 41 when the gradient of the bucket 7 is larger than the design gradient in the working data. In this case, the standard form of the bucket mark 43 is given by a form of a trapezoid, where the length of the lower edge is shorter than the working position mark 42.

As shown in FIG. 16, when the blade edge of the bucket 7 is at a position higher than the design height, the bucket mark 43 is displayed at the upper side compared with the working position mark 42, as shown in the guidance screens 41Ca to 41Cc. When the blade edge of the bucket 7 coincide with the design height, the bucket mark 43 is displayed in the condition where the position of the bucket mark 43 coincide with the working position mark 42 in up-down direction, as shown in the guidance screens 41Cd to 41Cf. When the blade edge of the bucket 7 is at a position lower than the design height, the bucket mark 43 is displayed at the lower side compared with the working position mark 42, as shown in the guidance screens 41Cg to 41Ci.

Also, when the direction of the bucket 7 is directed in the leftward direction compared with the working position, the bucket mark 43 is displayed at a position on the left side compared with the working position mark 42, as shown in the guidance screens 41Ca, 41Cd and 41Cg. When the direction of the bucket 7 coincide with the working position, the bucket mark 43 is displayed in such a condition that the bucket mark 43 coincide with the working position mark 42 in left-to-right direction, as shown in the guidance screens 41Cb, 41Ce and 41Ch. When the direction of the bucket 7 is directed in rightward direction compared with the working position, the bucket mark 43 is displayed at the right side compared with the position of the working position mark 42, as shown in the guidance screens 41Cc, 41Cf and 41Ci.

Also in the second embodiment to the fourth embodiment, three types of information such as the direction of the bucket 7, the gradient of the bucket 7, and the height of the bucket 7 with respect to the working position, as shown in individual screens, in the Japanese Patent Publication JP-A-2012-255286, can be displayed on a single screen according to the change of shape of the bucket marks 36, 39, and 43 shown by a predetermined shape such as a circle, a triangle, a trapezoid, etc., and according to the difference of position with respect to the working position marks 35, 38, and 42. Therefore, the operator can easily identify the guiding information up to the target position, and this contributes to the improvement of working efficiency in the excavation operation.

It is to be noted that in the first embodiment to the fourth embodiment, 3D eyeglasses are used as the display unit 26, and it is so designed that excavation operation is carried out while watching the bucket 7 and the guidance screens 31, 34, 37 and 41 at the same time, while it may also be so designed that a display unit such as monitor may be provided separately in the operation room 3, and the guidance screens 31, 34, 37 and 41 may be displayed on the display unit.

Also, in the first embodiment to the fourth embodiment, each of the working position marks 32, 35, 38, and 42 and the bucket marks 33, 36, 39 and 43 is expressed in shape of a quadrangle, a circle, a triangle and a trapezoid, while it is needless to say that if the direction of the machine body 2 and the gradient and the height of the bucket 7 can be expressed by means of form and position, other shapes, such as a polygonal or an ellipse other than a triangle, or a quadrangle.

Also, in the first embodiment, the third embodiment and the fourth embodiment, the length of one edge is variable, i.e. a distance between two points adjacent to each other is variable, while it may be arranged in such a manner that the bucket mark may be designed as a pentagon or a hexagon, for instance, and by setting the distance between two points not adjacent to each other as variable, the form of the bucket mark may be changed.

Also, in the first embodiment to the fourth embodiment, the bucket marks 33, 36, 39 and 43 are displayed in dual lines, while it may be arranged in such a manner that the bucket marks 33, 36, 39 and 43 may be displayed in different colors, or the like, compared with the working position marks 32, 35, 38 and 42, and when the working position marks 32, 35, 38 and 42 overlaps the bucket marks 33, 36, 39 and 43, other formalities may be used for display as far as two groups can be discriminated from each other.

Further, in the first embodiment to the fourth embodiment, the direction of the machine body 2 and the gradient and the height of the bucket 7 are expressed only according to the shape of the bucket marks 33, 36, 39 and 43 and according to the positions with respect to the working position marks 32, 35, 38 and 42, while combination of other data such as characters, arrow-marks, etc. may be displayed as described below.

FIG. 17A to FIG. 17E show other display examples of guidance screens 46, showing a case where the working position mark 44 and the bucket marks 45 are combined with other data.

Figure 17A:
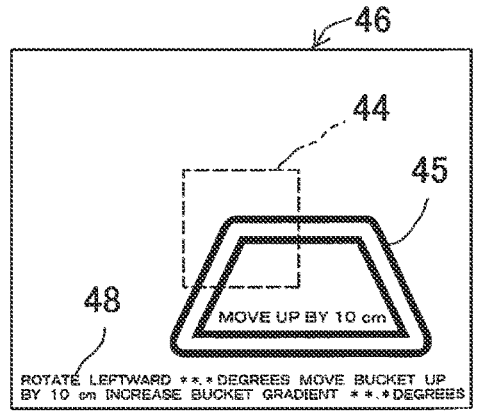

FIG. 17A shows a case where the guiding information up to the target position is expressed according to the combination of the working position mark 44 and the bucket mark 45, and further numerical value information such as a distance to the target position is expressed by characters 48. The guiding is performed by using not only the working position mark 44 and the bucket mark 45, but also by the characters 48. As a result, the guiding information up to the target position can be identified in easier manner.

Figure 17B:
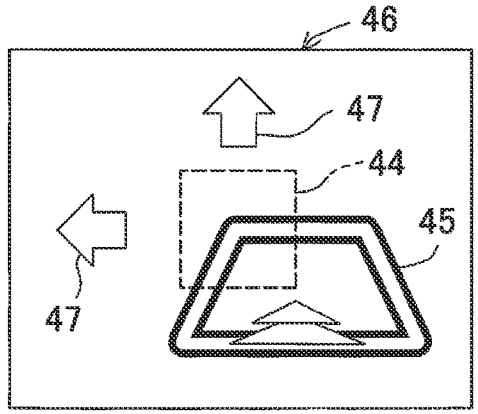

FIG. 17B shows a case where the guiding information up to the target position is expressed according to the combination of the working position mark 44 and the bucket mark 45, and an arrowmark 47 to indicate the direction to the target position. The guiding is performed by using not only the working position mark 44 and the bucket mark 45, but also by the arrowmark 47. As a result, the guiding information up to the target position can be identified in easier manner. It is to be noted that it may be arranged in such a manner that the arrowmarks 47 are given in larger size when the distance to the target position is far, or the arrowmarks 47 are given in smaller size when the distance to the target position is close, so that the distance to the target position can be identified by the change of the shape of the arrowmark 47.

Figure 17C:
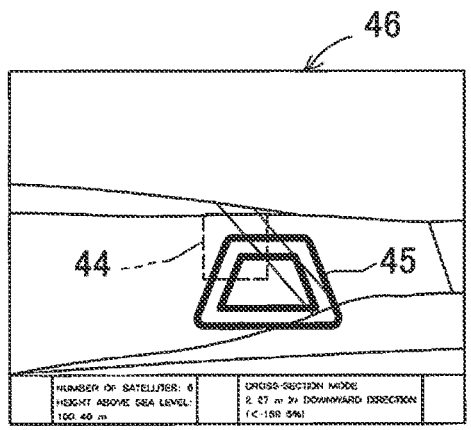

FIG. 17C shows a case where not only the working position mark 44 and the bucket mark 45 but also the GPS condition, which shows the number of satellites receiving, are displayed on the guidance screen 46. By simultaneously displaying the working data and the GPS condition in addition to the working position mark 44 and the bucket mark 45 to the guidance screen 46, it is possible to identify the guiding information and the present conditions at the same time, and also, to identify the accuracy of the guiding information.

Figure 17D:
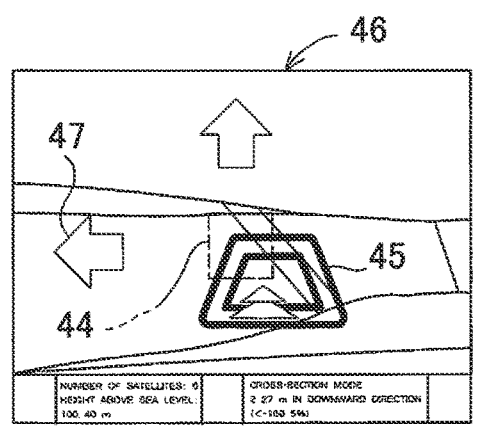

FIG. 17D shows a combination of the guidance screen 46 shown in FIG. 17B and the guidance screen 46 shown in FIG. 17C. The arrowmarks 47 are displayed as the guiding information in addition to the working position mark 44 and the bucket mark 45, and the working data and the GPS condition are displayed on the guidance screens 46 at the same time as the working position mark 44, the bucket mark 45, and the arrowmarks 47. Thereby, the guiding information up to the target position can be identified in an easier manner, and it is possible to identify the guiding information and the present condition at the same time, and can identify the accuracy of the guiding information.

Figure 17E:
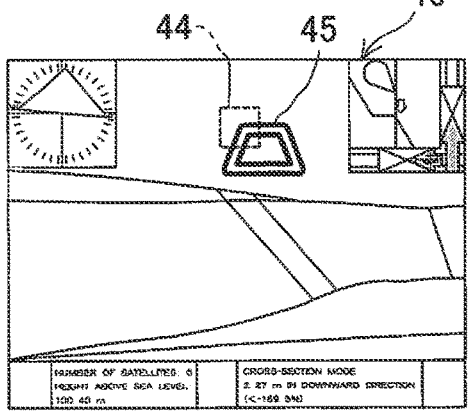

It is needless to say that, as shown in FIG. 17E, not only the working position mark 44 and the bucket mark 45, but also information (i.e. information as displayed in the guidance screens of the Japanese Patent Publication Laid-open JP-A-2012-255286) such as the direction of the bucket 7 or the tilting instruction with respect to the working data, the GPS condition, and the design position are displayed at the same time, and the present status of the bucket can be identified together with the guiding information.

In the first embodiment to the fourth embodiment, two GPS devices, i.e. the first GPS device 13 and the second GPS device 14 (see FIG. 1) are used as a position acquiring means for acquiring the absolute coordinates of the machine body 2, but only one GPS device may be used in a case where excavation operation is carried out when the machine body 2 is operated without moving, at a predetermined position.

In this case, first of all, the machine body 2 is rotated while GPS measurement is performed by the GPS device. By rotating the machine body 2, the arithmetic unit 23 calculates the absolute coordinates of the rotation center with respect to a horizontal plane, calculates the absolute coordinate of the machine center of the machine body 2 based on the calculation result, and acquires the absolute coordinates of the machine center of the machine body 2.

From the absolute coordinates of the machine center of the machine body 2 and from coordinates acquired by the GPS device, the arithmetic unit 23 calculates the rotating direction (azimuth) of the machine body 2, i.e. the direction of the bucket 7, and the direction of the bucket 7 can be acquired. At this time, by the GPS device and the arithmetic unit 23, a rotating direction acquiring device for acquiring the rotating direction of the machine body 2 is configured.

Further, in a case where the GPS device is provided at an unknown position with respect to the machine center of the machine body 2, it may be designed in such a manner that the formula of a locus of a circle thus formed can be acquired by the GPS device when the arithmetic unit 23 rotates the machine body 2, and the rotating center of the machine body 2 may be obtained from the formula thus acquired. By substituting the coordinates obtained by the GPS device into the formula, the arithmetic unit 23 specifies the position of the GPS device on the locus of the circle, and the rotating direction of the machine body 2 can be acquired from the coordinates of the rotating center of the machine body 2 and position of the GPS device.

Further, instead of two GPS devices, one total station installed at a known position with respect to the machine center of the machine body 2 may be used. A prism is provided at a predetermined point on the machine body 2, and tracking is carried out on the prism by the total station. From the total station, a distance and a rotation angle to the prism is obtained respectively, and based on the distance and the rotation angle as obtained, the arithmetic unit 23 calculates the absolute coordinates of the machine body 2, and the absolute coordinates of the machine body 2 can be acquired. In this case, the total station and the prism make up together a position acquiring means for acquiring absolute coordinates of the machine body 2.

The invention claimed is:

1. A construction machine control system, comprising a working tool, a working arm for supporting said working tool and for operating said working tool as required, a machine body for supporting said working arm and for being rotatable, a rotating direction acquiring unit provided on said machine body, a control unit having a storage unit and a display unit, wherein said working arm is configured by two or more links with length already known respectively which are connected in a bendable manner, wherein there are further provided a two-axis tilt sensor on said machine body for detecting a horizontal position, a working arm tilt sensor for detecting a tilting of each links of said working arm, and a working tool tilt sensor for detecting a tilting of said working tool, wherein said control unit displays a guidance screen on said display unit based on a working data stored in said storage unit and where a working position and a design gradient are set, based on a direction of said machine body acquired from said rotating direction acquiring unit, and based on detection results of said two-axis tilt sensor, said working arm tilt sensor and said working tool tilt sensor, and said guidance screen displays a guiding information for guiding said working tool to the working position, wherein a working position mark and a bucket mark having predetermined shapes are displayed on said guidance screen as guiding information, a condition of said working tool with respect to the working position is indicated depending on a change of the shape of said bucket mark and on a difference of position with respect to said working position mark, and said working tool is guided to the working position so that the shape and the position of said working position mark and said bucket mark coincide with each other.

2. A construction machine control system according to claim 1, wherein said rotating direction acquiring unit further comprises a position acquiring means for acquiring absolute coordinates of said machine body, and an operating position of said machine body is acquired by said position acquiring means.

3. A construction machine control system according to claim 2, wherein said position acquiring means is provided on said machine body, absolute coordinates are acquired by said position acquiring means while said machine body rotates, absolute coordinates of a rotation center is acquired based on the absolute coordinates acquired at the time of rotation, and direction of said machine body is acquired from absolute coordinates of said rotation center and from absolute coordinates of said position acquiring means.

4. A construction machine control system according to claim 2, wherein said position acquiring means comprises a prism disposed at a position as required of said machine body, and a total station installed at a known position.

5. A construction machine control system according to claim 1, wherein said bucket mark indicates the difference between the design gradient and a gradient of said working tool by the change of shape with respect to said working position mark, and shows the difference between the position of said working tool and said working position by the change of position of said bucket mark with respect to said working position mark.

6. A construction machine control system according to claim 1, wherein said working position mark and said bucket mark are in polygonal shape, two vertexes of polygon of said bucket mark are controlled in a displaceable manner, and the gradient of said working tool with respect to the design gradient is displayed by a distance between said two vertexes.

7. A construction machine control system according to claim 1, wherein said working position mark and said bucket mark are in circular or elliptical shape, the length of one diameter of said bucket mark is constant, the length of a diameter perpendicularly crossing said diameter is controlled variably, and the gradient of said working tool with respect to the design gradient is displayed, depending on the length of said diameter perpendicularly crossing each other.

8. A construction machine control system according to claim 1, wherein said guidance screen further displays numeral value information.

9. A construction machine control system according to claim 1, wherein said guidance screen further displays an arrowmark to indicate a direction of the working position and a rotating direction up to the design gradient.

10. A construction machine control system according to claim 1, wherein said guidance screen further displays a direction of said working tool, a height of said working tool, and the gradient of said working tool.

11. A construction machine control system according to claim 1, wherein said guidance screen further displays a GPS condition.

12. A construction machine control system according to claim 1, wherein said guidance screen further displays the working data.

13. A construction machine control system according to claim 5, wherein said working position mark and said bucket mark are in polygonal shape, two vertexes of polygon of said bucket mark are controlled in a displaceable manner, and the gradient of said working tool with respect to the design gradient is displayed by a distance between said two vertexes.

14. A construction machine control system according to claim 5, wherein said working position mark and said bucket mark are in circular or elliptical shape, the length of one diameter of said bucket mark is constant, the length of a diameter perpendicularly crossing said diameter is controlled variably, and the gradient of said working tool with respect to the design gradient is displayed, depending on the length of said diameter perpendicularly crossing each other.

15. A construction machine control system according to claim 8, wherein said guidance screen further displays an arrowmark to indicate a direction of the working position and a rotating direction up to the design gradient.

16. A construction machine control system according to claim 8, wherein said guidance screen further displays a direction of said working tool, a height of said working tool, and the gradient of said working tool.

17. A construction machine control system according to claim 8, wherein said guidance screen further displays a GPS condition.

18. A construction machine control system according to claim 8, wherein said guidance screen further displays the working data.

19. The construction machine control system of claim 1, wherein said working position mark is displayed as fixed at a center of said guidance screen, and a bucket mark shows a present situation, said working position mark shows said working data, a difference between the design gradient and a gradient of said working tool is shown by a change of shape of said bucket mark with respect to said working position mark, a difference of position of said working tool with respect to said working position is displayed by a difference of position of said bucket mark with respect to said working position mark, and a direction of said working tool with respect to said working position is shown by a direction of a deviation of position of said bucket mark from said working position mark.

* * * * *